US010694393B2

(12) United States Patent
Baldemair et al.

(10) Patent No.: US 10,694,393 B2
(45) Date of Patent: Jun. 23, 2020

(54) UPLINK AND/OR DOWNLINK SIGNALING RELATED TO DIFFERENT RADIO ACCESS TECHNOLOGIES

(71) Applicant: Telefonaktiebolaget LM Ericsson (publ), Stockholm (SE)

(72) Inventors: Robert Baldemair, Solna (SE); Stefan Parkvall, Bromma (SE); Gunnar Mildh, Sollentuna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 15/525,340

(22) PCT Filed: Nov. 10, 2015

(86) PCT No.: PCT/SE2015/051187
§ 371 (c)(1),
(2) Date: May 9, 2017

(87) PCT Pub. No.: WO2017/082780
PCT Pub. Date: May 18, 2017

(65) Prior Publication Data
US 2017/0347271 A1 Nov. 30, 2017

(51) Int. Cl.
H04W 16/14 (2009.01)
H04L 5/12 (2006.01)
(Continued)

(52) U.S. Cl.
CPC .......... H04W 16/14 (2013.01); H04W 28/20 (2013.01); H04W 72/04 (2013.01); H04W 72/12 (2013.01);
(Continued)

(58) Field of Classification Search
CPC ..... H04W 16/14; H04W 28/20; H04W 72/04; H04W 72/12; H04W 88/06; H04L 5/12; H04L 27/2653
See application file for complete search history.

(56) References Cited

U.S. PATENT DOCUMENTS 9,071,399 B2    6/2015  Drewes et al.
2002/0172163 A1*  11/2002  Chen .................. H04B 7/2621
                                                 370/281
(Continued)

FOREIGN PATENT DOCUMENTS

JP    H08331153 A    12/1996
JP    2009296199 A   12/2009
(Continued)

OTHER PUBLICATIONS

3rd Generation Partnership Project; Technical Specification Group Radio Access Network; E-UTRA, UTRA and GSM/EDGE; Multi-Standard Radio (MSR) Base Station (BS) radio transmission and reception (Year: 2014).*
(Continued)

Primary Examiner — Mehmood B. Khan
(74) Attorney, Agent, or Firm — Withrow & Terranova, PLLC

(57) ABSTRACT

There is provided network units operating based on different radio access technologies and one or more associated wireless communication devices. In downlink, DL, a network unit of the first RAT is configured to transmit a DL carrier in a frequency channel of the first RAT that is higher than the frequency channel of the second RAT. Correspondingly, a wireless communication device is configured to receive and demodulate and/or decode the DL carrier of the first RAT. In the uplink, UL, the wireless communication device is configured to transmit an UL carrier of the first RAT in an UL frequency channel overlapping with the UL frequency chan-
(Continued)

nel of the second RAT. Correspondingly, the network unit is configured to receive and demodulate and/or decode the UL carrier of the first RAT.

28 Claims, 20 Drawing Sheets

(51) Int. Cl.
*H04L 27/26* (2006.01)
*H04W 28/20* (2009.01)
*H04W 72/04* (2009.01)
*H04W 72/12* (2009.01)
*H04W 88/06* (2009.01)
*H04W 36/00* (2009.01)

(52) U.S. Cl.
CPC ....... *H04W 72/1215* (2013.01); *H04W 88/06* (2013.01); *H04L 5/12* (2013.01); *H04L 27/2653* (2013.01); *H04W 36/0069* (2018.08)

(56) References Cited

U.S. PATENT DOCUMENTS

| | | | |
|---|---|---|---|
| 2008/0220788 A1* | 9/2008 | Stanwood | H04L 5/0007 455/450 |
| 2009/0147678 A1* | 6/2009 | Xhafa | H04L 1/0002 370/232 |
| 2011/0205979 A1 | 8/2011 | Silk et al. | |
| 2012/0082107 A1 | 4/2012 | Ou et al. | |
| 2012/0120849 A1* | 5/2012 | Kazmi | H04W 24/02 370/255 |
| 2012/0140743 A1* | 6/2012 | Pelletier | H04W 72/0453 370/335 |
| 2013/0028119 A1* | 1/2013 | Ben-Eli | H04W 48/16 370/252 |
| 2013/0250870 A1* | 9/2013 | Kaukovuori | H04W 72/082 370/329 |
| 2014/0126530 A1* | 5/2014 | Siomina | H04W 52/146 370/330 |
| 2014/0286170 A1 | 9/2014 | Ericson et al. | |
| 2015/0109932 A1* | 4/2015 | Goldhamer | H04W 72/0453 370/236 |
| 2015/0180689 A1 | 6/2015 | Deriche et al. | |
| 2015/0289266 A1* | 10/2015 | Hsu | H04L 1/1893 370/329 |
| 2016/0302114 A1* | 10/2016 | Jain | H04W 36/0083 |
| 2017/0006632 A1* | 1/2017 | Elliott | H04L 69/324 |
| 2017/0086175 A1* | 3/2017 | Yasukawa | H04L 1/0013 |
| 2017/0265225 A1* | 9/2017 | Takeda | H04W 72/1284 |

FOREIGN PATENT DOCUMENTS

| | | |
|---|---|---|
| JP | 2013232782 A | 11/2013 |
| RU | 2519903 C2 | 6/2014 |
| WO | 2007149961 A1 | 12/2007 |
| WO | 2012109195 A2 | 8/2012 |
| WO | 2013184770 A1 | 12/2013 |
| WO | 2014181627 A1 | 11/2014 |
| WO | 2015022975 A1 | 2/2015 |

OTHER PUBLICATIONS

3GPPTS 37.104 V11.11.0 (Dec. 2014) Technical Specification 3rd Generation Partnership Project; Technical Specification Group Radio Access Network; E-UTRA, UTRA and GSM/EDGE; Multi-Standard Radio (MSR) Base Station (BS) radio (Year: 2014).*
Author Unknown, "Reconfigurable Radio Systems (RRS); Use Cases for Operation in White Space Frequency Bands," Technical Report 102 907, Version 1.1.6, European Telecommunication Standards Institute (ETSI), Sep. 2012, 65 pages.
Author Unknown, "Technical Specification Group Radio Access Network; Evolved Universal Terrestrial Radio Access (E-UTRA); User Equipment (UE) radio transmission and reception (Release 12)," Technical Specification 36.101, Version 12.9.0, 3GPP Organizational Partners, Oct. 2015, 765 pages.
International Search Report and Written Opinion for PCT/SE2015/051187, dated Jul. 15, 2016, 21 pages.
NTT Docomo, Inc., "RWS-150051: 5G Vision for 2020 and Beyond," 3GPP RAN workshop on 5G, Sep. 17-18, 2015, Phoenix, AZ, 23 pages.
Notification of Reasons for Refusal for Japanese Patent Application No. 2018-523452, dated Mar. 12, 2019, 44 pages.
Decision to Grant for Russian Patent Application No. 2018121098/08, dated Feb. 5, 2019, 18 pages.
Extended European Search Report for European Patent Application No. 15908393.0, dated Apr. 24, 2019, 7 pages.
Examiner Requisition for Canadian Patent Application No. 3,003,388, dated Oct. 11, 2019, 5 pages.
Notice of Reasons for Refusal for Japanese Patent Application No. 2018-523452, dated Nov. 19, 2019, 9 pages.
Notification of Reason for Refusal for Korean Patent Application No. 10-2018-7016245, dated Sep. 30, 2019, 15 pages.

* cited by examiner

UPLINK AND/OR DOWNLINK SIGNALING RELATED TO DIFFERENT RADIO ACCESS TECHNOLOGIES

This application is a 35 U.S.C. § 371 national phase filing of International Application No. PCT/SE2015/051187, filed Nov. 10, 2015, the disclosure of which is incorporated herein by reference in its entirety.

TECHNICAL FIELD

The proposed technology generally relates to a wireless communication device configured for operation in a wireless communication system and a method of operating a wireless communication device, and network unit(s) configured for operation in a wireless communication system and method (s) of operating a network unit, and a network unit configured to perform management of time and/or frequency resources for radio communication in a wireless communication system and a corresponding method as well as corresponding computer programs and computer-program products and apparatuses.

BACKGROUND

Mobile and wireless communications technology is constantly evolving, introducing new and more advanced technologies for wireless communications. With the existing wireless communication systems as a basis, next generation mobile communication technologies will be a key component of the so-called Networked Society and will help realizing the vision of substantially unlimited access to information and sharing of data anywhere and anytime.

By way of example, 5G is an important step in the evolution of mobile communications. To enable connectivity for a wide range of applications and use cases, the capabilities of the next generation wireless access must extend beyond previous generations of mobile communications. Most likely, this will be realized through the continued development of Long Term Evolution, LTE in combination with new 5G radio access technologies (also referred to as NX, NeXt generation). Key technology components may for example include extension to higher frequency bands, advanced multi-antenna transmission, and/or flexible spectrum usage.

However, it is not yet clear how these key technology components will be implemented and what the new radio access technologies will look like, while still being compatible or at least interoperable with existing mobile and wireless communication systems.

In fact, interoperability and/or interworking of different radio access technologies is a particularly interesting challenge in general.

There is thus a general demand for improved solutions in mobile and wireless communications technology.

SUMMARY

It is an object to provide a wireless communication device configured for operation in a wireless communication system.

It is another object to provide a method of operating a wireless communication device in a wireless communication system.

It is also an object to provide network unit(s) configured for operation in a wireless communication system.

Another object is to provide method(s) of operating a network unit in a wireless communication system.

Yet another object is to provide a network unit configured to perform management of time and/or frequency resources for radio communication in a wireless communication system.

Still another object is to provide a method for management of time and/or frequency resources for radio communication in a wireless communication system.

It is also an object to provide corresponding computer programs and computer-program products.

Yet another object is to provide apparatus(es) for controlling operation(s) in a wireless communication device.

Still another object is to provide an apparatus for management of time and/or frequency resources for radio communication in a wireless communication system.

These and other objects are met by embodiments of the proposed technology.

According to a first aspect, there is provided a wireless communication device configured for operation in a wireless communication system. The wireless communication device is configured with an uplink, UL, carrier of a first radio access technology, RAT. The wireless communication device is also configured with a downlink, DL, carrier of the first RAT. The wireless communication device is further configured to transmit the UL carrier of the first RAT in an uplink frequency channel overlapping with the uplink frequency channel of a second RAT. The wireless communication device is configured to receive and demodulate and/or decode the DL carrier of the first RAT in a frequency channel of the first RAT that is higher than the frequency channel of the second RAT.

According to a second aspect, there is provided a method of operating a wireless communication device in a wireless communication system. The method comprises receiving and demodulating and/or decoding downlink, DL, signaling in a DL carrier of a first radio access technology, RAT, in a frequency channel of the first RAT that is higher than the frequency channel of a second RAT. The method also comprises preparing uplink, UL, signaling for transmission in an uplink, UL, carrier of the first RAT, and transmitting the UL signaling in the UL carrier of the first RAT in an uplink frequency channel overlapping with the uplink frequency channel of the second RAT.

According to a third aspect, there is provided a network unit configured for operation in a wireless communication system. The network unit is a base station of a first radio access technology, RAT, and the network unit is configured to receive and demodulate and/or decode an uplink, UL, carrier of the first RAT in an uplink frequency channel overlapping with the uplink frequency channel of a second RAT. The network unit is further configured to transmit a downlink, DL, carrier of the first RAT in a frequency channel of the first RAT that is higher than the frequency channel of the second RAT.

According to a fourth aspect, there is provided a network unit configured for operation in a wireless communication system. The network unit is a base station of a second radio access technology, RAT, and the network unit is configured to receive and demodulate and/or decode an uplink, UL, carrier of a first RAT in an uplink frequency channel overlapping with the uplink frequency channel of the second RAT. The network unit is further configured to forward information related to the uplink, UL, carrier of the first RAT to a base station of the first RAT.

According to a fifth aspect, there is provided a method of operating a network unit in a wireless communication system, wherein the network unit is a base station of a first radio access technology, RAT. The method comprises receiving and demodulating and/or decoding an uplink, UL, carrier of the first RAT in an uplink frequency channel overlapping with the uplink frequency channel of a second RAT, and transmitting a downlink, DL, carrier of the first RAT in a frequency channel of the first RAT that is higher than the frequency channel of the second RAT.

According to a sixth aspect, there is provided a method of operating a network unit in a wireless communication system, wherein the network unit is a base station of a second radio access technology, RAT. The method comprises receiving and demodulating and/or decoding an uplink, UL, carrier of a first RAT in an uplink frequency channel overlapping with the uplink frequency channel of the second RAT, and forwarding information related to the uplink, UL, carrier of the first RAT to a base station of the first RAT.

According to a seventh aspect, there is provided a network unit configured to perform management of time and/or frequency resources for radio communication in a wireless communication system. The network unit is configured to determine a time and/or frequency resource split of an uplink frequency channel between an uplink channel of a first radio access technology, RAT, and an uplink channel of a second RAT.

According to an eighth aspect, there is provided a method for management of time and/or frequency resources for radio communication in a wireless communication system. The method comprises determining a time and/or frequency resource split of an uplink frequency channel between an uplink channel of a first radio access technology, RAT, and an uplink channel of a second RAT.

According to a ninth aspect, there is provided a computer program comprising instructions, which when executed by at least one processor, cause the at least one processor to:
  effectuate configuration(s) of a wireless communication device such that the wireless communication device is configured with an uplink, UL, carrier of a first radio access technology, RAT, for transmission of the UL carrier in an uplink frequency channel overlapping with the uplink frequency channel of a second RAT, and
  effectuate configuration(s) of the wireless communication device such that the wireless communication device is configured with a downlink, DL, carrier of the first RAT, for reception and demodulation and/or decoding of the DL carrier in a frequency channel of the first RAT that is higher than the frequency channel of the second RAT.

According to a tenth aspect, there is provided a computer program comprising instructions, which when executed by at least one processor, cause the at least one processor to:
  effectuate configuration(s) of a network unit such that the network unit is configured for reception and demodulation and/or decoding of an uplink, UL, carrier of a first radio access technology, RAT in an uplink frequency channel overlapping with the uplink frequency channel of a second RAT.

According to an eleventh aspect, there is provided a computer program comprising instructions, which when executed by at least one processor, cause the at least one processor to determine a time and/or frequency resource split of an uplink frequency channel between an uplink channel of a first radio access technology, RAT, and an uplink channel of a second RAT.

According to a twelfth aspect, there is provided a computer-program product comprising a computer-readable medium having stored thereon a computer program according to any of the ninth to eleventh aspects.

According to a thirteenth aspect, there is provided an apparatus for controlling operation(s) in a wireless communication device. The apparatus comprises an uplink, UL, configuration module for effectuating configuration(s) of the wireless communication device such that the wireless communication device is configured with an uplink, UL, carrier of a first radio access technology, RAT, for transmission of the UL carrier in an uplink frequency channel overlapping with the uplink frequency channel of a second RAT. The apparatus also comprises a downlink, DL, configuration module for effectuating configuration(s) of the wireless communication device such that the wireless communication device is configured with a downlink, DL, carrier of the first RAT, for reception and demodulation and/or decoding of the DL carrier in a frequency channel of the first RAT that is higher than the frequency channel of the second RAT.

According to a fourteenth aspect, there is provided an apparatus for controlling operation(s) in a network unit of a wireless communication system. The apparatus comprises a configuration module for effectuating configuration(s) of a network unit such that the network unit is configured for reception and demodulation and/or decoding of an uplink, UL, carrier of a first radio access technology, RAT, in an uplink frequency channel overlapping with the uplink frequency channel of a second RAT.

According to a fifteenth aspect, there is provided an apparatus for management of time and/or frequency resources for radio communication in a wireless communication system. The apparatus comprises a determination module for determining a time and/or frequency resource split of an uplink frequency channel between an uplink channel of a first radio access technology, RAT, and an uplink channel of a second RAT.

Embodiments of the proposed technology enables interoperability between different radio access technologies, while allowing improved performance for users. By way of example, the proposed technology enables next generation scenarios where wireless communication devices does not need to have a high-frequency transmitter and/or enables reliable control signaling feedback at lower frequencies.

Other possible advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 1:
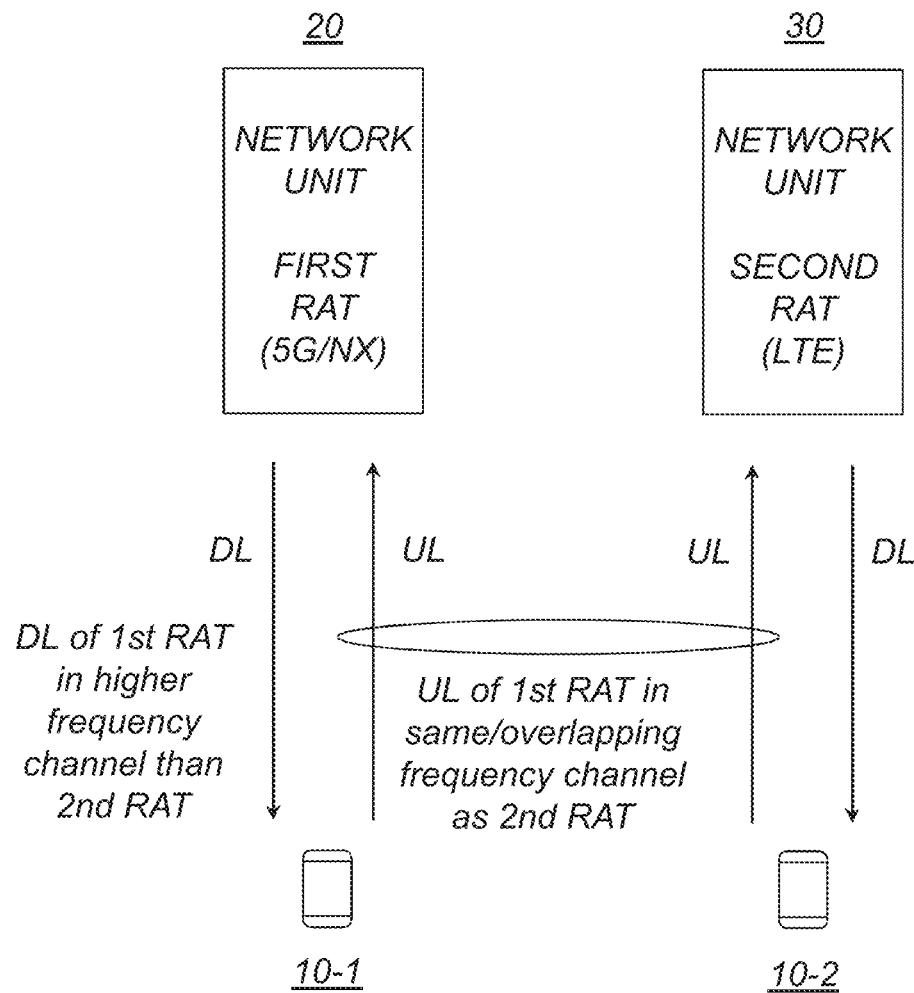
FIG. 1 is a schematic diagram illustrating an example of a wireless communication system comprising network units operating based on different radio access technologies and associated wireless communication devices configured for operation in the wireless communication system according to an embodiment.

Throughout the drawings, the same reference designations are used for similar or corresponding elements.

As used herein, the non-limiting term "wireless communication device", may refer to User Equipment (UE), a mobile station, a mobile terminal, a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as a non-limiting term comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network unit" may refer to any network unit configured for operation in and/or for managing and/or controlling a wireless communication system, including network nodes such as base stations, access points, relay nodes, network control nodes such as network controllers, radio network controllers, base station controllers, access controllers, and the like.

In particular, the term "base station" may encompass different types of radio base stations including standardized base station functions such as Node Bs, or evolved Node Bs (eNBs), and optionally also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like.

It should also be understood that the term "network unit" may refer to any device located in connection with and/or for controlling and/or managing certain aspects of a wireless communication network, including but not limited to network units or devices in access networks, core networks and similar network structures. The term network device may also encompass cloud-based network devices.

The non-limiting term "radio access technology" generally relates to the underlying technology for providing and/or supporting radio access in a wireless network. By way of example, the term "radio access technology" may refer to the underlying physical connection method for a radio based communication network: Examples may include Bluetooth, Wi-Fi, 3G, 4G or Long Term Evolution, LTE, and 5G or Next Generation, NX.

The non-limiting term "carrier" may refer to any physical and/or logical information carrying structure that enables conveying information over a radio medium. In particular, the term "carrier" may refer to the radio signal(s) carrying information. By way of example, a carrier may be seen as a waveform that is modulated with an input signal for the purpose of conveying information at a given frequency or frequency channel.

The non-limiting term "frequency channel" may refer to a specific interval in the overall radio frequency range that may be used for radio transmission and/or reception. Normally, a given frequency range, called operating band, is divided into a number of frequency channels. The frequency channels may be regarded as independent entities, and may belong to different operators. A frequency channel is typically defined by the location within the overall radio frequency range and has a bandwidth, sometimes referred to as channel bandwidth, defining the size of the frequency channel. Frequency channels may be defined in the downlink and/or uplink directions of communication.

The non-limiting term "channel" may refer to a frequency channel having a given channel bandwidth, but may also refer to an information carrying structure for operation in a given frequency channel, possibly dedicated for control information and/or user information.

FIG. 1 is a schematic diagram illustrating an example of a wireless communication system comprising network units operating based on different radio access technologies and associated wireless communication devices configured for operation in the wireless communication system according to an embodiment.

In this example, a network unit 20 is configured to operate based on a first radio access technology, RAT and a network unit 30 is configured to operate based on a second RAT. The wireless communication system also comprises wireless communication devices 10-1, 10-2, such as UEs, that are served by the network units 20, 30 and configured for uplink, UL, and/or downlink, DL, communication with the network units 20, 30.

In the downlink, DL, the network unit 20 of the first RAT is configured to transmit a DL carrier in a frequency channel of the first RAT that is higher than the frequency channel of the second RAT. In other words, the DL carrier of the first RAT is transmitted in a higher frequency range than the operating frequency of the second RAT.

Correspondingly, the wireless communication device 10-1 is configured to receive and demodulate and/or decode the DL carrier of the first RAT in a frequency channel of the first RAT that is higher than the frequency channel of the second RAT.

In the uplink, UL, the wireless communication device 10-1 is configured to transmit an UL carrier of the first RAT in an uplink frequency channel overlapping with the uplink frequency channel of the second RAT.

Correspondingly, the network unit 20 is configured to receive and demodulate and/or decode the uplink, UL, carrier of the first RAT in an uplink frequency channel overlapping with the uplink frequency channel of a second RAT.

By way of example, the first RAT may be a 5G or NX RAT and the second RAT may be a RAT based on LTE, as will be discussed in detail later on.

Figure 2:
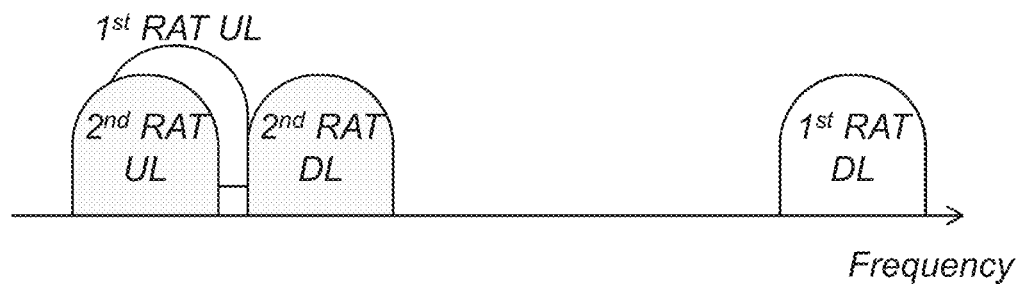
FIG. 2 is a schematic diagram illustrating an example of frequency channels used for uplink and downlink communication by a first radio access technology and a second radio access technology according to an embodiment.

FIG. 2 is a schematic diagram illustrating an example of frequency channels used for uplink and downlink communication by a first radio access technology and a second radio access technology according to an embodiment.

In this example, it can be seen that the DL frequency channel of the first RAT is higher than the DL frequency channel (and the UL frequency channel) of the second RAT. It is also clear that the UL frequency channel of the first RAT is overlapping with the UL frequency channel of the second RAT. In a particular example, the UL frequency channel of the first RAT may even be the same as the UL frequency channel of the second RAT.

In general, there may be propagation and/or coverage challenges at higher frequencies.

In addition to propagation limitations that may become more severe at higher frequency ranges, there could also be challenges in the UL coverage since the UE maximum output power can be power limited (possibly even due to regulatory reasons). For example, electromagnetic field (EMF) regulations may limit the UE transmission power in the UL, especially at higher frequency ranges, e.g. above 6 GHz.

Also, the UL does not benefit so much from more spectrum since the total power is usually the same. The DL in the base station on the other hand may be able to provide more power when getting more spectrum.

It may thus be beneficial to have the UL in lower spectrum and a wider DL bandwidth in higher spectrum.

Figure 3:
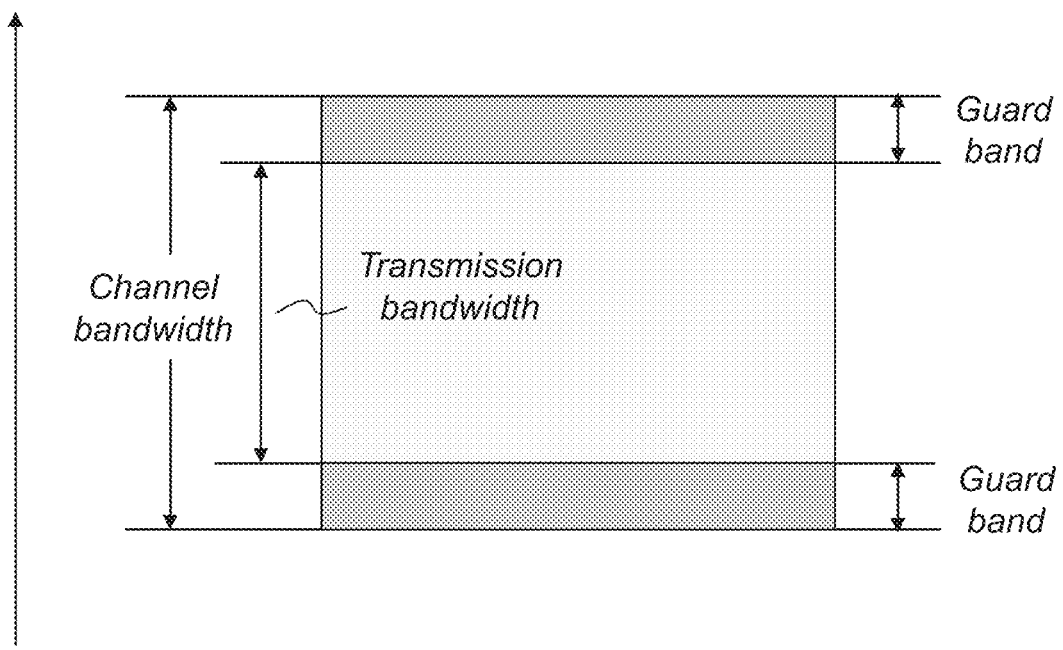
FIG. 3 is a schematic diagram illustrating an example of the overall structure and configuration a frequency channel that can be used for communication in a wireless communication system.

FIG. 3 is a schematic diagram illustrating an example of the overall structure and configuration a frequency channel that can be used for communication in a wireless communication system.

As previously mentioned, a frequency channel is defined by the location within the overall radio frequency range and has a channel bandwidth defining the size of the frequency channel. Frequency channels may be defined in the downlink and/or uplink directions of communication. Normally, a frequency channel has two guard bands, one on each edge, enclosing and "guarding" the transmission bandwidth within the frequency channel.

Figure 4:
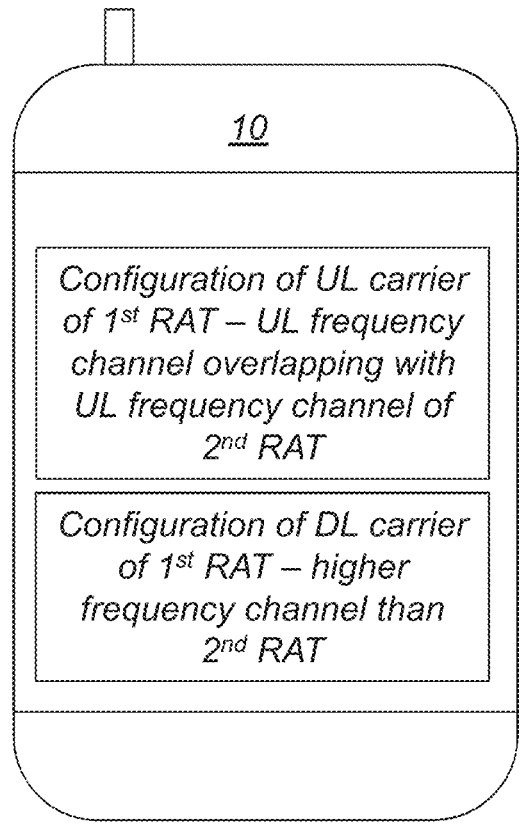
FIG. 4 is a schematic diagram illustrating an example of a wireless communication device configured for operation in a wireless communication system according to an embodiment.

FIG. 4 is a schematic diagram illustrating an example of a wireless communication device configured for operation in a wireless communication system according to an embodiment.

In this example, the wireless communication device 10 is configured with an uplink, UL, carrier of a first radio access technology, RAT. The wireless communication device 10 is also configured with a downlink, DL, carrier of the first RAT.

In particular, the wireless communication device 10 is configured to transmit the UL carrier of the first RAT in an uplink frequency channel overlapping with the uplink frequency channel of a second RAT. The wireless communication device 10 is also configured to receive and demodulate and/or decode the DL carrier of the first RAT in a frequency channel of the first RAT that is higher than the frequency channel of the second RAT.

In an illustrative example, the wireless communication device 10 is configured to transmit uplink control information in an uplink, UL, control channel of the UL carrier of the first RAT in the uplink frequency channel overlapping with the uplink frequency channel of the second RAT. By way of example, the uplink control information is related to the DL carrier.

Although the proposed technology is generally applicable to different radio access technologies, the first RAT may for example be a 5G or NX RAT, and/or the second RAT may for example be a RAT based on Long Term Evolution, LTE.

It should be understood that as defined herein LTE-based RATs include all different types of RATs based on LTE.

It should be understood that a particularly useful application scenario involves any RAT based on LTE as the second RAT, and any higher generation RAT, irrespective of the specific label or naming of the RAT, as the first RAT, which at least for the downlink operates at a higher frequency.

By way of example, LTE frequency channels may have a bandwidth selected from 1.4, 3, 5, 10, 15, 20 MHz bandwidth at various locations in the overall radio frequency range.

In the table below, examples of LTE frequency bands, also referred to as operating bands, are given with reference to 3GPP TS 36.101, V12.9.0, October 2015:

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD[2] |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD[2] |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

NOTE:
[1]Band 6 is not applicable
NOTE:
[2]Restricted to E-UTRA operation when carrier aggregation is configured. The downlink operating band is paired with the uplink operating band (external) of the carrier aggregation configuration that is supporting the configured Pcell.

The 5G or NX frequency channels are expected to range from 1 MHz to 2 GHz bandwidth at a carrier frequency from sub-1 GHz to around 100 GHz or higher.

LTE will play an important role for the overall wireless access solution, especially for frequency bands below 6 GHz, whereas 5G or NX will likely be mostly used above 6 GHz, although there may be a gradual migration into existing spectrum.

In a particular example, the wireless communication device 10 may be configured to transmit the UL carrier of the first RAT in at least one specific part of the uplink frequency channel of the second RAT.

For example, the wireless communication device 10 may be configured to transmit the UL carrier of the first RAT in at least one guard band of the uplink frequency channel of the second RAT.

Alternatively, or as a complement, the wireless communication device 10 may for example be configured to transmit the UL carrier of the first RAT in at least one dedicated part of the uplink frequency channel of the second RAT inside the transmission bandwidth of the frequency channel.

By way of example, the wireless communication device 10 may be configured to receive configuration information indicating the at least one specific part of the uplink frequency channel of the second RAT to enable configuration of the wireless communication device for transmission of the UL carrier of the first RAT in the at least one specific part of the frequency channel.

In an optional embodiment, the wireless communication device 10 may also be configured with a DL carrier and/or an UL carrier of the second RAT, based on Dual Connectivity or Multi-Connectivity procedures, as will be discussed later on. This is a likely scenario for multi-RAT capable UEs.

As will be discussed later on, the wireless communication device 10 may for example be implemented based on processor-memory technology, where the wireless communication device 10 comprises a processor and a memory, and the memory comprises instructions executable by the processor, whereby the processor is operative to enable and/or support the operation of the wireless communication device.

Figure 5:
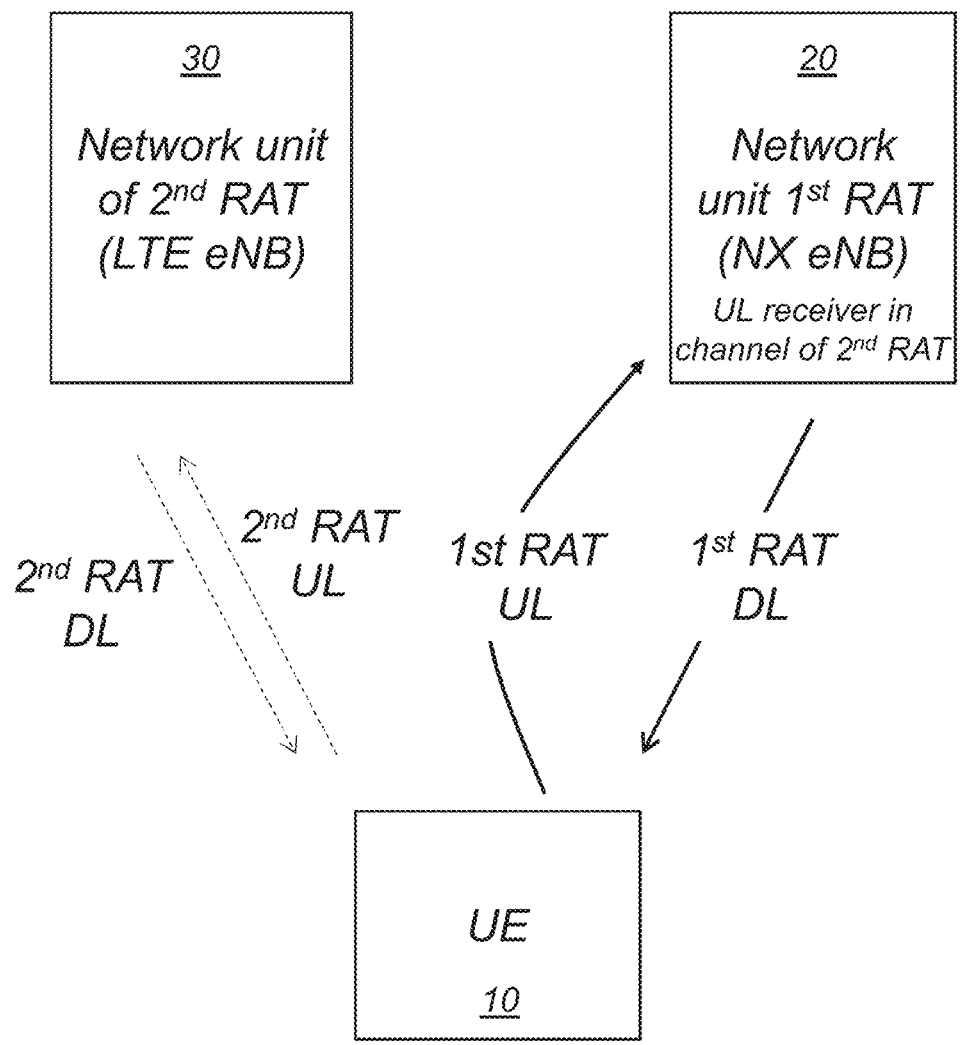
FIG. 5 is a schematic diagram illustrating an example of network units configured for operation in a wireless communication system to enable communication with an associated wireless communication device according to an embodiment.

FIG. 5 is a schematic diagram illustrating an example of network units 20, 30 configured for operation in a wireless communication system to enable communication with an associated wireless communication device 10 according to an embodiment.

In this particular example, the network unit 20 is a base station of a first radio access technology, RAT. The network unit 20 is configured to receive and demodulate and/or decode an uplink, UL, carrier of the first RAT in an uplink frequency channel overlapping with the uplink frequency channel of a second RAT. The network unit 20 is also configured to transmit a downlink, DL, carrier of the first RAT in a frequency channel of the first RAT that is higher than the frequency channel of the second RAT.

By way of example, the network unit 20 of the first RAT may be a base station specifically having an UL receiver for operation in the same or an overlapping frequency channel as the uplink frequency channel of the second RAT.

Optionally, the network unit 30 of the second RAT can also be serving the wireless communication device 10 based on the second RAT. The network unit 30 may be a base station. For example, the wireless communication device 10 may be configured with a DL carrier and/or an UL carrier of the second RAT, based on Dual Connectivity.

Figure 6:
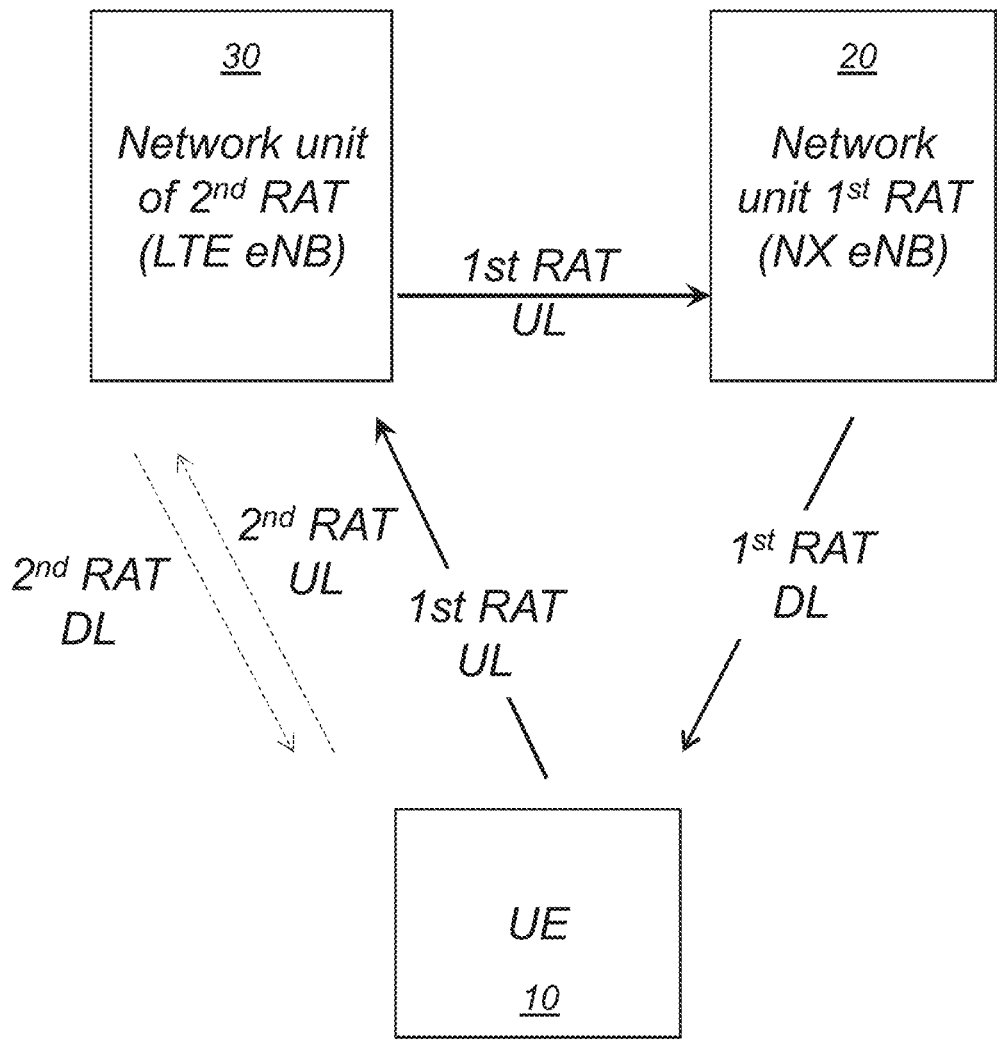
FIG. 6 is a schematic diagram illustrating another example of network units configured for operation in a wireless communication system to enable communication with an associated wireless communication device according to an embodiment.

FIG. 6 is a schematic diagram illustrating another example of network units configured for operation in a wireless communication system to enable communication with an associated wireless communication device according to an embodiment.

In this example, the network unit 30, which is a base station of the second RAT, is configured to receive and demodulate and/or decode an uplink, UL, carrier of a first RAT in an uplink frequency channel overlapping with the uplink frequency channel of the second RAT. The network unit 30 is further configured to forward information related to the uplink, UL, carrier of the first RAT to the network unit 20 being a base station of the first RAT.

In this example, the network unit 20 of the first RAT may be configured to transmit a downlink, DL, carrier of the first RAT in a frequency channel of the first RAT that is higher than the frequency channel of the second RAT.

Optionally, the network unit 30 of the second RAT can also be serving the wireless communication device 10 based on the second RAT, based on Dual Connectivity.

With reference to the examples of FIG. 5 and/or FIG. 6, the network unit 20 may for example be configured to receive and demodulate and/or decode uplink control information in an uplink, UL, control channel of the UL carrier of the first RAT in the uplink frequency channel overlapping with the uplink frequency channel of the second RAT.

By way of example, the uplink control information may be related to the DL carrier of the first RAT.

As an example, the first RAT may be a 5G or NX RAT, and/or the second RAT may be a RAT based on Long Term Evolution, LTE. The network unit 20 may thus be, e.g. a 5G/NX eNB and/or the network unit 30 may be, e.g. an LTE eNB.

With further reference to the examples of FIG. 5 and/or FIG. 6, the network unit 20 (FIG. 5) and/or network unit 30 (FIG. 6) may be configured to receive and demodulate and/or decode the UL carrier of the first RAT in at least one specific part of the uplink frequency channel of the second RAT.

For example, the network unit 20/30 may be configured to receive and demodulate and/or decode the UL carrier of the first RAT in at least one guard band of the uplink frequency channel of the second RAT.

Alternatively, or as a complement, the network unit 20/30 may be configured to receive and demodulate and/or decode the UL carrier of the first RAT in at least one dedicated part of the uplink frequency channel of the second RAT inside the transmission bandwidth of the frequency channel.

In a particular example embodiment, the network unit 20/30 may further be configured to transmit configuration information indicating the at least one specific part of the uplink frequency channel of the second RAT to at least one associated wireless communication device 10 to enable configuration of the wireless communication device(s) for transmission of the UL carrier of the first RAT in the at least one specific part of the frequency channel.

Each of the network units 20/30 may be based on a processor-memory implementation, where the network unit 20/30 comprises a processor and a memory, where the memory comprises instructions executable by the processor, whereby the processor is operative to enable and/or support the operation of the network unit. This will be discussed in further detail later on.

Figure 7:
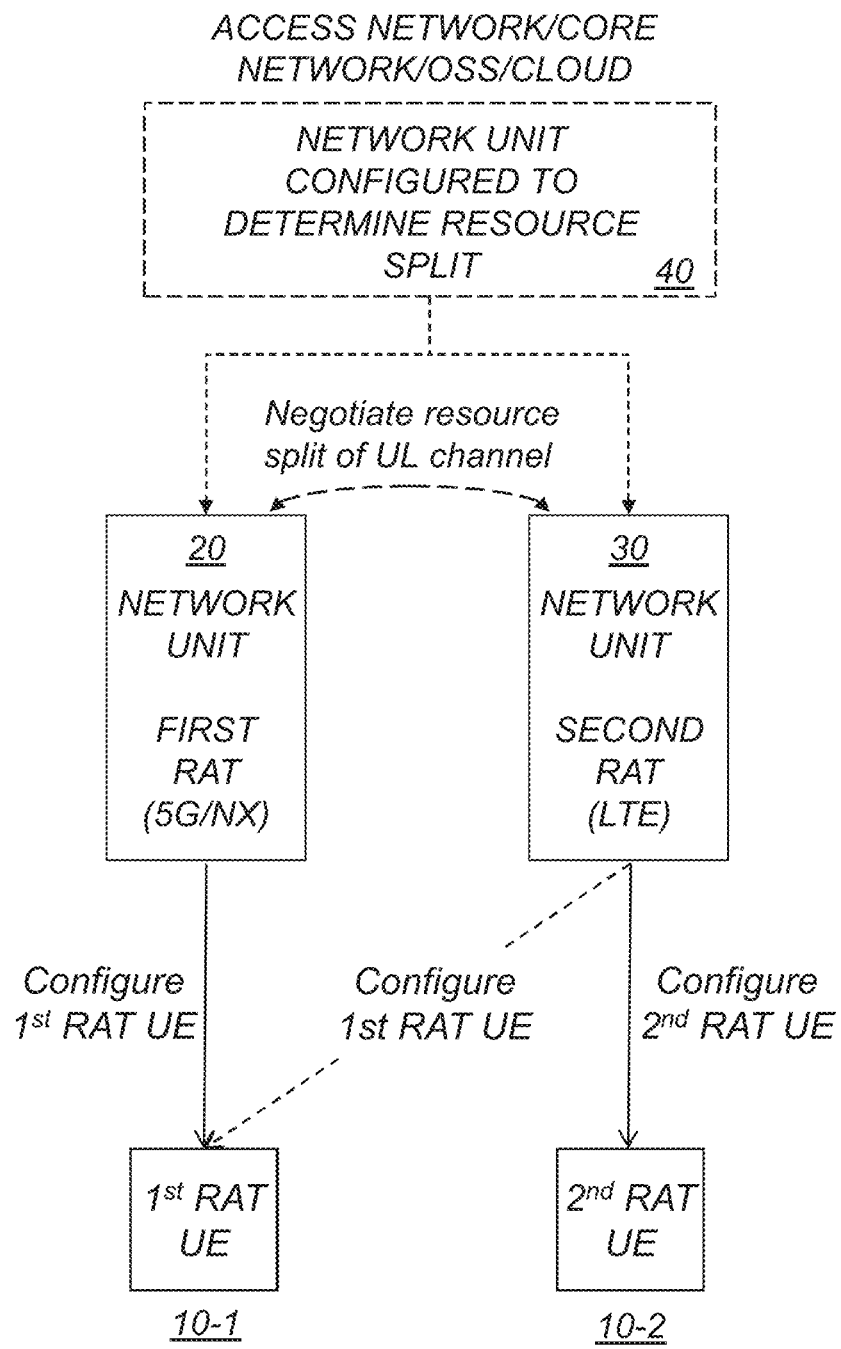
FIG. 7 is a schematic diagram illustrating an example of the determination of a time and/or frequency resource split of an uplink frequency channel, performed by an individual network unit or as part of a negotiation between different network units, and the corresponding configuration of associated wireless communication devices.

FIG. 7 is a schematic diagram illustrating an example of the determination of a time and/or frequency resource split of an uplink frequency channel, performed by an individual network unit or as part of a negotiation between different network units, and the corresponding configuration of associated wireless communication devices.

In general, there is provided a network unit 20/30/40 configured to perform management of time and/or frequency resources for radio communication in a wireless communication system. The network unit 20/30/40 may be configured to determine a time and/or frequency resource split of an uplink frequency channel between an uplink channel of a first radio access technology, RAT, and an uplink channel of a second RAT.

By way of example, the first RAT may be a 5G or NX RAT and/or the second RAT may be a Long Term Evolution, LTE, based RAT.

As an example, the network unit 20/30/40 may be configured to determine said time and/or frequency resource split of the uplink frequency channel between an uplink control channel of the first RAT and one or more uplink channels of the second RAT.

In a particular set of examples, the network unit 20/30 may be configured to participate in a negotiation of the resource split.

Figure 8A:
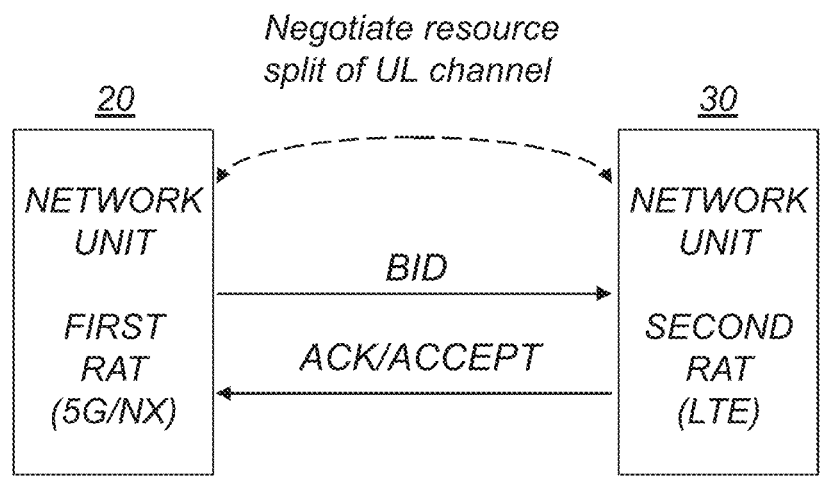
FIG. 8A and FIG. 8B are schematic diagrams illustrating alternative examples of a negotiation of a time and/or frequency resource split of an uplink frequency channel.

In a first example, referring to FIG. 8A, the network unit 20 may be configured for operation based on the first RAT, and configured to send information (BID) about the determined resource split to a network unit 30 of the second RAT and configured to receive an acknowledgment (ACK/ACCEPT) from the network unit 30 of the second RAT accepting the determined resource split of the uplink frequency channel.

For example, the network unit 20 may be a 5G or NX base station.

Figure 8B:
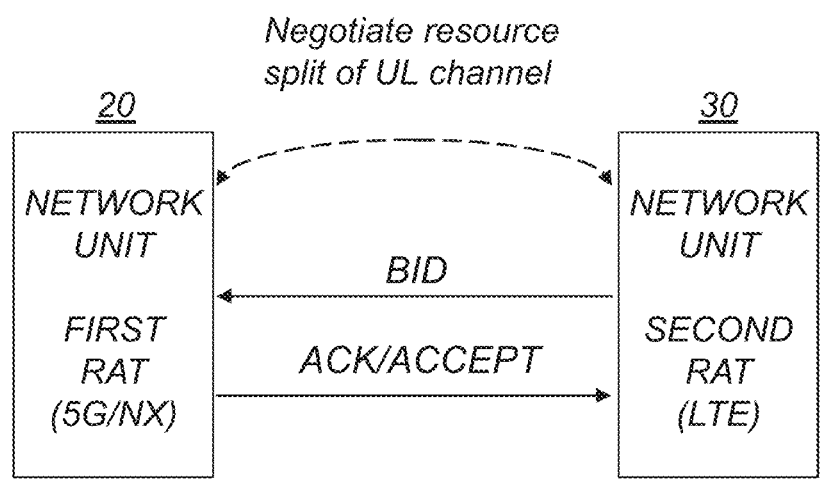

In a second example, referring to FIG. 8B, the network unit 30 may be configured for operation based on the second RAT, and configured to send information (BID) about the determined resource split to a network unit 20 of the first RAT and configured to receive an acknowledgment (ACK/ACCEPT) from the network unit of the first RAT accepting the determined resource split of the uplink frequency channel.

For example, the network unit 30 may be an LTE base station.

If the offered bid regarding the resource split cannot be accepted, a rejection may be sent. The rejection may be sent together with a counter-offer, or just as a simple rejection awaiting a new bid.

However, the negotiation may also be regarded as a simple hand-shake procedure, without involving the possibility of actually rejecting the determined resource split.

With reference once again to FIG. 7, it can be seen that the network unit 20 and/or network unit 30 may be adapted to configure associated wireless communication devices 10-1 and/or 10-2 based on the determined resource split of the uplink frequency channel, as will be discussed later on.

As previously indicated, the resource split may be determined by a separate network unit 40, which may be configured for location in the access network, core network, OSS and/or even in a cloud-based network environment.

For example, such a network unit 40 may be configured to inform a base station 20 of the first RAT and/or a base station 30 of the second RAT of the determined resource split of the uplink frequency channel to enable configuration of wireless communication devices associated with the base station 20 of the first RAT and/or the base station 30 of the second RAT based on the determined resource split.

In the following section, the proposed technology will be described as a method for use in a wireless communication device.

Figure 9:
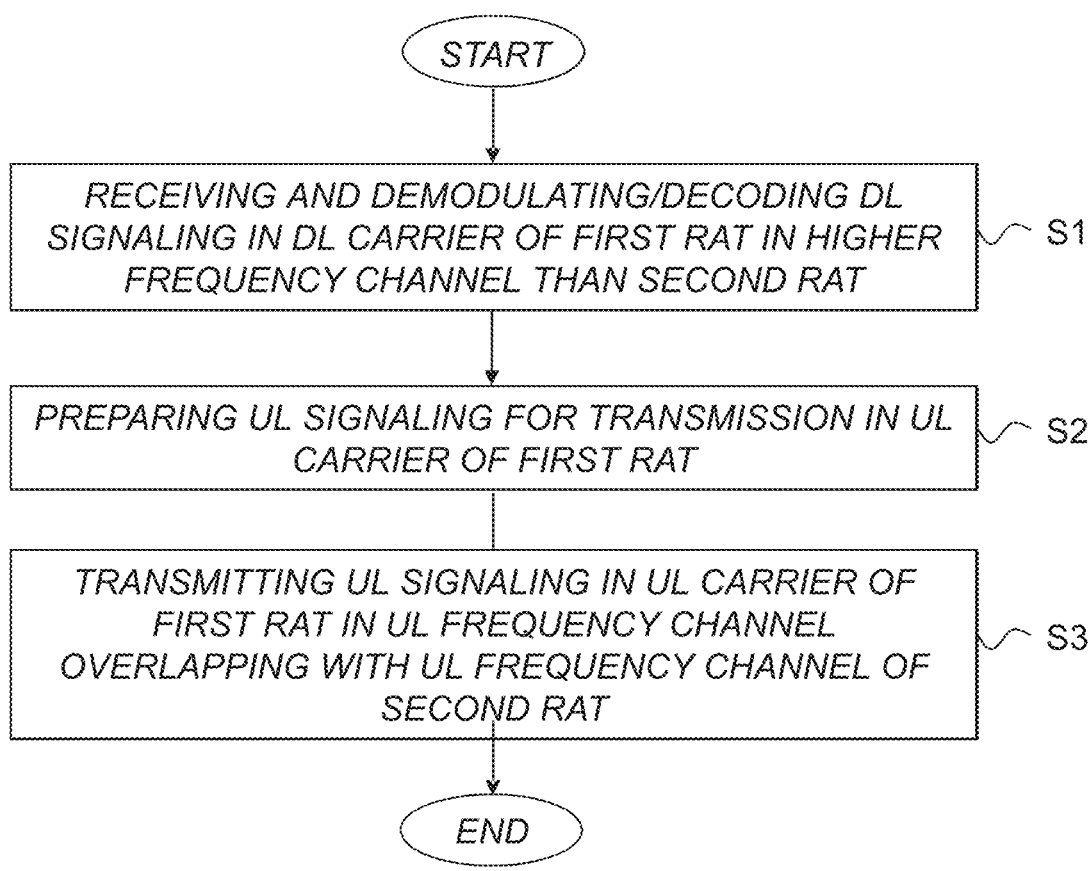
FIG. 9 is a schematic flow diagram illustrating an example of a method of operating a wireless communication device in a wireless communication system according to an embodiment.

FIG. 9 is a schematic flow diagram illustrating an example of a method of operating a wireless communication device in a wireless communication system according to an embodiment.

Basically, the method comprises the following steps:

S1: receiving and demodulating and/or decoding downlink, DL, signaling in a DL carrier of a first radio access technology, RAT, in a frequency channel of the first RAT that is higher than the frequency channel of a second RAT, S2: preparing uplink, UL, signaling for transmission in an uplink, UL, carrier of the first RAT, and S3: transmitting the UL signaling in the UL carrier of the first RAT in an uplink frequency channel overlapping with the uplink frequency channel of the second RAT.

By way of example, uplink control information may be transmitted in an uplink, UL, control channel of the UL carrier of the first RAT in the uplink frequency channel overlapping with the uplink frequency channel of the second RAT.

For example, the uplink control information may be related to the DL carrier.

In a particular example, the first RAT is a 5G or NX RAT, and/or the second RAT is a RAT based on Long Term Evolution, LTE.

In a set of example embodiments, the UL carrier of the first RAT may be transmitted in at least one specific part of the uplink frequency channel of the second RAT.

For example, the UL carrier of the first RAT may be transmitted in at least one guard band of the uplink frequency channel of the second RAT.

Alternatively, or as a complement, the UL carrier of the first RAT may be transmitted in at least one dedicated part of the uplink frequency channel of the second RAT inside the transmission bandwidth of the frequency channel.

In an optional embodiment, the wireless communication device also receives configuration information indicating the at least one specific part of the uplink frequency channel of the second RAT to enable configuration of the wireless communication device for transmission of the UL carrier of the first RAT in the at least one specific part of the frequency channel.

It is also possible to share at least part of the uplink frequency channel of the second RAT in a time-multiplexed manner between the first RAT and the second RAT, as will be exemplified later on.

In the following section, the proposed technology will be described as a method for use in a network unit.

Figure 10:
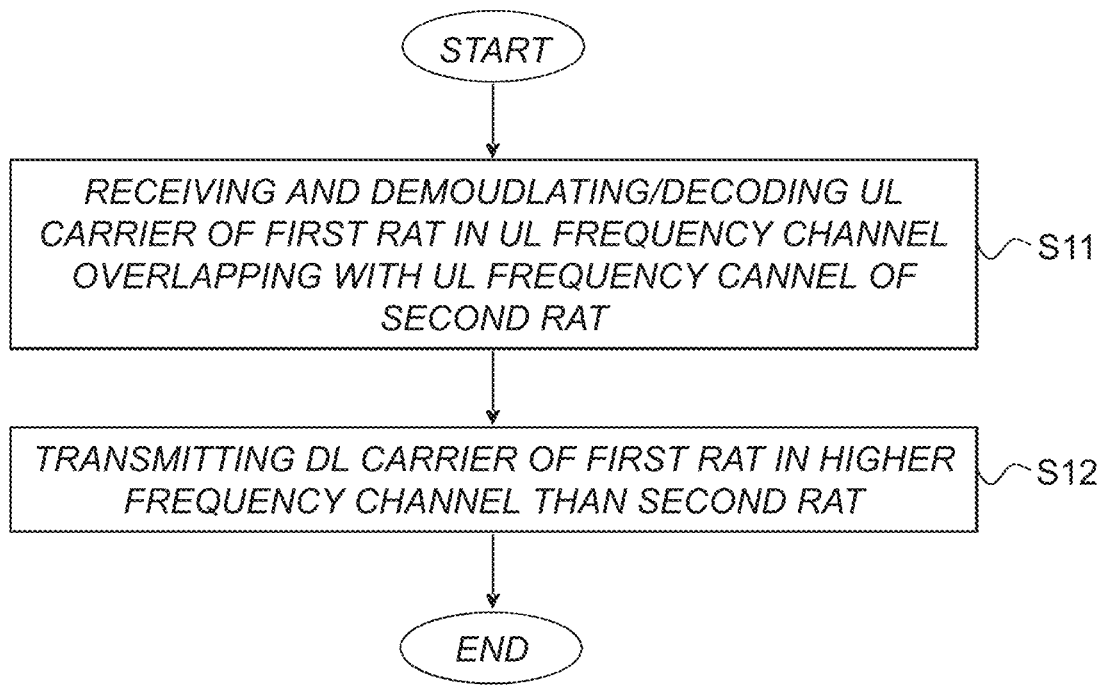
FIG. 10 is a schematic flow diagram illustrating an example of a method of operating a network unit in a wireless communication system, wherein the network unit is a base station of a first radio access technology.

FIG. 10 is a schematic flow diagram illustrating an example of a method of operating a network unit in a wireless communication system, wherein the network unit is a base station of a first radio access technology.

Basically, the method comprises the following steps:

S11: receiving and demodulating and/or decoding an uplink, UL, carrier of the first RAT in an uplink frequency channel overlapping with the uplink frequency channel of a second RAT, and S12: transmitting a downlink, DL, carrier of the first RAT in a frequency channel of the first RAT that is higher than the frequency channel of the second RAT.

Figure 11:
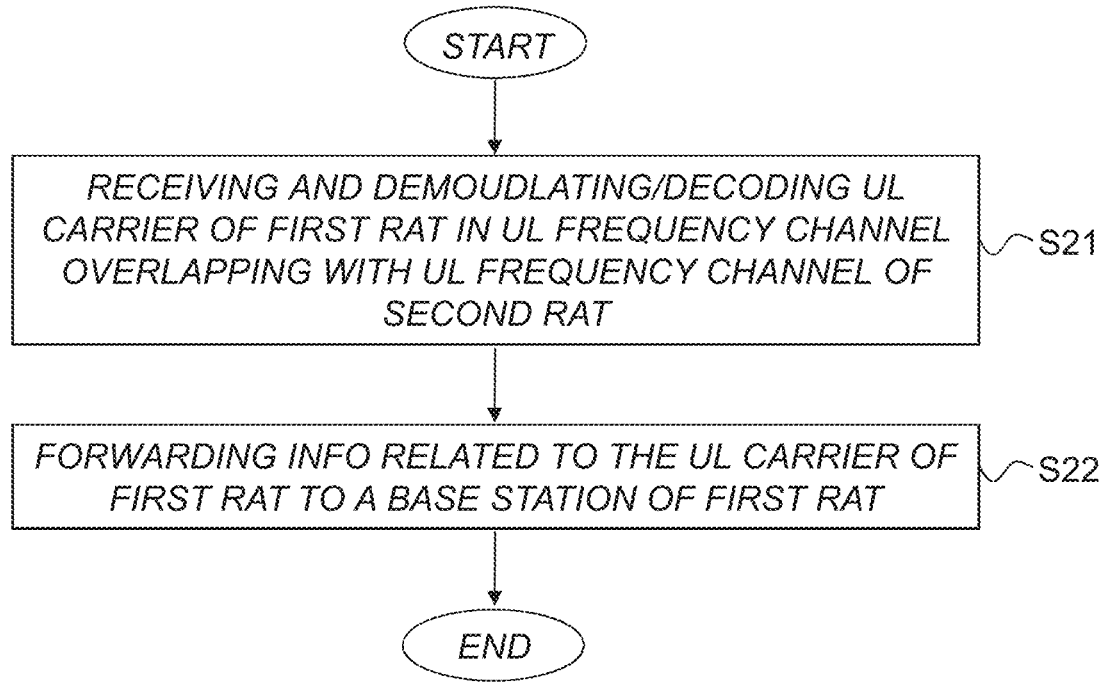
FIG. 11 is a schematic flow diagram illustrating another example of a method of operating a network unit in a wireless communication system, wherein the network unit is a base station of a second radio access technology.

FIG. 11 is a schematic flow diagram illustrating another example of a method of operating a network unit in a wireless communication system, wherein the network unit is a base station of a second radio access technology.

Basically, the method comprises the following steps:

S21: receiving and demodulating and/or decoding an uplink, UL, carrier of a first RAT in an uplink frequency channel overlapping with the uplink frequency channel of the second RAT, and S22: forwarding information related to the uplink, UL, carrier of the first RAT to a base station of the first RAT.

With reference to the methods of operating a network unit of FIG. 10 and FIG. 11, uplink control information may be received and demodulated and/or decoded in an uplink, UL, control channel of the UL carrier of the first RAT in the uplink frequency channel overlapping with the uplink frequency channel of the second RAT.

For example, the uplink control information may be related to a DL carrier of the first RAT.

In a particular example, the first RAT is a 5G or NX RAT, and/or the second RAT is a RAT based on Long Term Evolution, LTE.

In a set of embodiments, the UL carrier of the first RAT may be received and demodulated and/or decoded in at least one specific part of the uplink frequency channel of the second RAT.

For example, the UL carrier of the first RAT may be received and demodulated and/or decoded in at least one guard band of the uplink frequency channel of the second RAT.

Alternatively, or as a complement, the UL carrier of the first RAT may be received and demodulated and/or decoded in at least one dedicated part of the uplink frequency channel of the second RAT inside the transmission bandwidth of the frequency channel.

Optionally, configuration information indicating the at least one specific part of the uplink frequency channel of the second RAT is transmitted to at least one associated wireless communication device to enable configuration of the wireless communication device(s) for transmission of the UL carrier of the first RAT in the at least one specific part of the uplink frequency channel.

Figure 12:
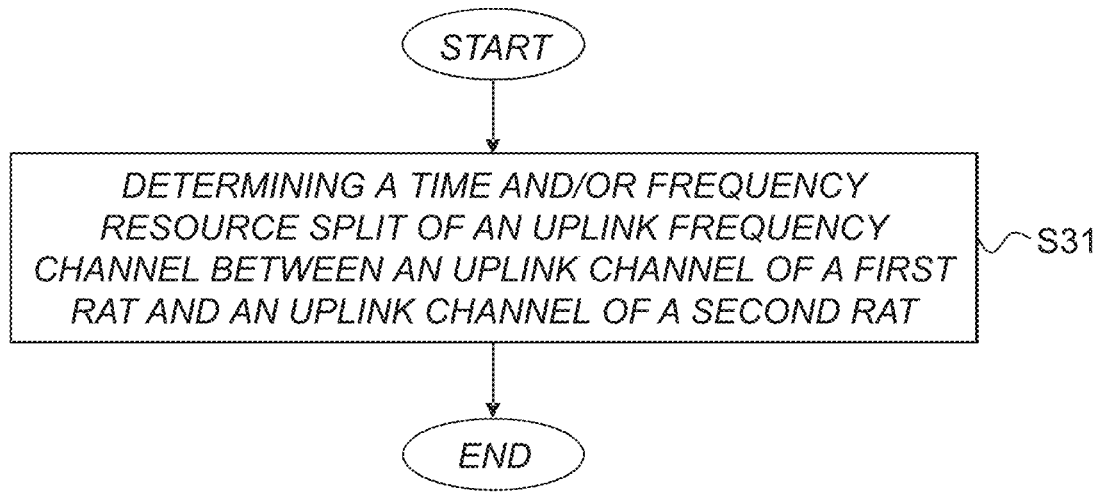
FIG. 12 is a schematic flow diagram illustrating an example of a method for management of time and/or frequency resources for radio communication in a wireless communication system.

FIG. 12 is a schematic flow diagram illustrating an example of a method for management of time and/or frequency resources for radio communication in a wireless communication system. The method comprises determining, in step S31, a time and/or frequency resource split of an uplink frequency channel between an uplink channel of a first radio access technology, RAT, and an uplink channel of a second RAT.

In a particular example, the first RAT is a 5G or NX RAT and/or said second RAT is a Long Term Evolution, LTE, based RAT.

As an example, the determining step comprises determining the time and/or frequency resource split of the uplink frequency channel between an uplink control channel of the first RAT and one or more uplink channels of the second RAT.

As previously mentioned, the step of determining a time and/or frequency resource split may be part of a negotiation between a network unit of the first RAT and a network unit of the second RAT.

For example, the method may be performed by the network unit of the first RAT, which sends information about the determined resource split to the network node of the second RAT and receives an acknowledgment from the network unit of the second RAT accepting the determined resource split of the uplink frequency channel.

Alternatively, the method is performed by the network unit of the second RAT, which sends information about the determined resource split to the network node of the first RAT and receives an acknowledgment from the network unit of the first RAT accepting the determined resource split of the uplink frequency channel.

The proposed technology also provides the possibility for wireless communication devices to be configured based on the determined resource split of the uplink frequency channel.

In yet another example, the method may be performed by a network unit, which informs a base station of the first RAT and/or a base station of the second RAT of the determined resource split of the uplink frequency channel to enable configuration of wireless communication devices associated with the base station of the first RAT and/or the base station of the second RAT based on the determined resource split.

Multi-RAT integration and Multi-Connectivity features such as Dual Connectivity may also be of interest as a complementary part of the proposed technology.

By way of example, Multi-Connectivity or Dual Connectivity procedures can be used to establish and maintain connectivity legs with radio nodes of different radio access technologies.

In existing multi-RAT integration (e.g. between LTE and UTRAN), each RAT typically has its own RAN protocol stack and its own core networks where both core networks are linked via inter-node interfaces. It is however possible and/or desirable to provide a tighter integration of RATs.

In a particular embodiment, a tight integration of LTE and NX is proposed, e.g. to enable seamless connectivity to LTE and NX for a given UE.

An example of a possible solution may involve RAN level integration, e.g. based on the LTE Rel-12 Dual Connectivity solution, with MAC layer integration (which would enable multi-RAT carrier aggregation) or RRC/PDCP layer integration for LTE and NX. Here, the integration layer may interact with the RAT specific lower layer protocols (for NX and LTE respectively).

For example, tight integration aims to fulfill 5G user requirements such as very high data rates by user plane aggregation or ultra-reliability by user or control plane diversity. User plane aggregation is particularly efficient if NX and LTE offer similar throughput for a particular user so that the aggregation can roughly double the throughput. The occurrence of these cases will depend on the allocated spectrum, the coverage and the load of the two radio accesses.

In addition to these, it is worth to mention that the tight integration also provide enhancements to existing multi-RAT features such as load balancing and service continuity due to the RAN level integration being transparent to the core network.

In terms of network deployments, LTE and NX can be co-located (e.g., baseband being implemented in the same physical node AKA ideal backhaul) or non-co-located (e.g. baseband implemented in separate physical nodes).

On the UE side, there may for example be UEs with dual radios, one for each RAT, where each radio has a receiver and transmitter (RX/TX), and where these radios can be operated simultaneously. Such UEs will be able to be fully connected to LTE and NX at the same time without requiring time division operation on lower layers. From a specification point, tight integration may be easier to specify for this UE type. However, from an implementation point of view, two transmitter chains (uplink) operating simultaneously introduces new challenges, including the need to split the limited TX power across the two TXs as well as possible intermodulation problems. Thus, there may be UEs with dual RX but single TX, as these are easier to implement. Finally, there may also be single-radio low cost UEs capable of both air interfaces, but only one at a time.

In the following, the proposed technology will be described with reference to non-limiting examples with reference to LTE and 5G/NX as the radio access technologies concerned. It should be understood that the proposed technology is not limited thereto, as already explained.

In a particular example scenario, the NX DL operates at higher frequencies and the NX UL operates at lower frequencies. Possible reasons for this setup may for example be a terminal not supporting a high-frequency transmitter, insufficient uplink coverage at high frequencies, spectrum licensing, or power consumption in the terminal.

According to the proposed technology, the NX UL may share UL frequency channel with another RAT, such as LTE.

For example, the NX UL may be operated at low frequencies in an LTE UL channel, using NX waveform. In this way, NX UL and LTE UL may share resources to create transmission opportunities for NX. At high frequencies NX operates a DL carrier.

In some cases, NX UL will be restricted to control information such as L1/L2 UL control signaling related to the NX DL and "user" UL data would be served via LTE (assuming the UE is connected to both LTE and NX). However, for DL heavy services one can even imagine that all NX UL is transmitted using NX UL.

Figure 13:
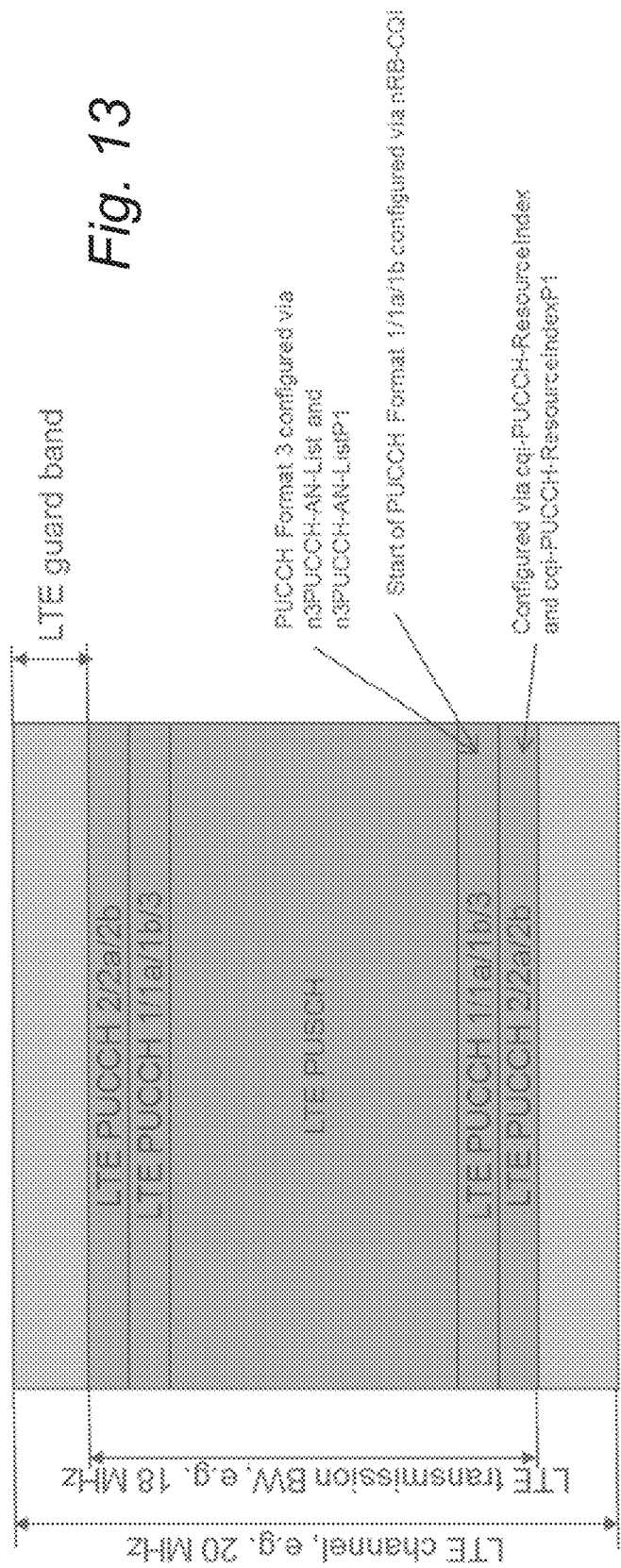
FIG. 13 is a schematic diagram illustrating an example of the time-frequency grid of an LTE uplink frequency channel with PUSCH and PUCCH channels.

FIG. 13 is a schematic diagram illustrating an example of the time-frequency grid of an LTE uplink frequency channel with PUSCH and PUCCH channels. At the band edges Channel State Information (CSI) is transmitted using Physical Uplink Control Channel (PUCCH) Format 2/2a/2b. PUCCH resources for CSI are configured using the parameters cqi-PUCCH-ResourceIndex and cqi-PUCCH-ResourceIndexP1 (for antenna port 1, if present), respectively. Via this parameter it is possible to move PUCCH Format 2/2a/2b inside the carrier.

CSI is followed by ACK/NACK feedback and scheduling request using PUCCH Format 1/1a/1b and PUCCH Format 3. The starting position of PUCCH Format 1/1a/1b in frequency domain can be configured via the parameter nRB-CQI. How far PUCCH Format 1/1a/1b extends inside the carrier depends on configuration but also changes dynamically, depending on the scheduling of users. Resources for PUCCH Format 3 are configured via the parameter n3PUCCH-AN-List and n3PUCCH-AN-ListP1 (for antenna port 1, if present), respectively.

Physical Uplink Shared Channel (PUSCH) is normally transmitted in-between the PUCCH regions. Its frequency location dynamically varies depending on scheduling and the scheduler must make sure it does not overlap with the bordering PUCCH region which can "breath" into the PUSCH region.

NX and LTE may use different transmission schemes or parametrization of the same transmission scheme that are not orthogonal towards each other but interfere with each other.

As a starting point, the inventors have envisioned that NX may transmit its UL in the guard bands of LTE. This is possible since in a wideband LTE carrier such as 10 and 20 MHz some more subcarriers can be squeezed in without violating the out-of-band emission requirements outside the channel bandwidth. If the data rate of NX UL requires more bandwidth, NX UL signaling has to move inwards and use frequencies originally occupied by LTE UL. To avoid interference the LTE UL should be reconfigured and leave frequencies used by NX UL empty, i.e. NX and LTE eNBs may negotiate and agree on an NX UL bandwidth and to reconfigure LTE to accommodate NX UL.

Solutions provide reliable control information such as HARQ feedback of NX at lower frequencies which is needed for good performance. It also enables scenarios where a UE does not have a high-frequency transmitter.

Figure 14:
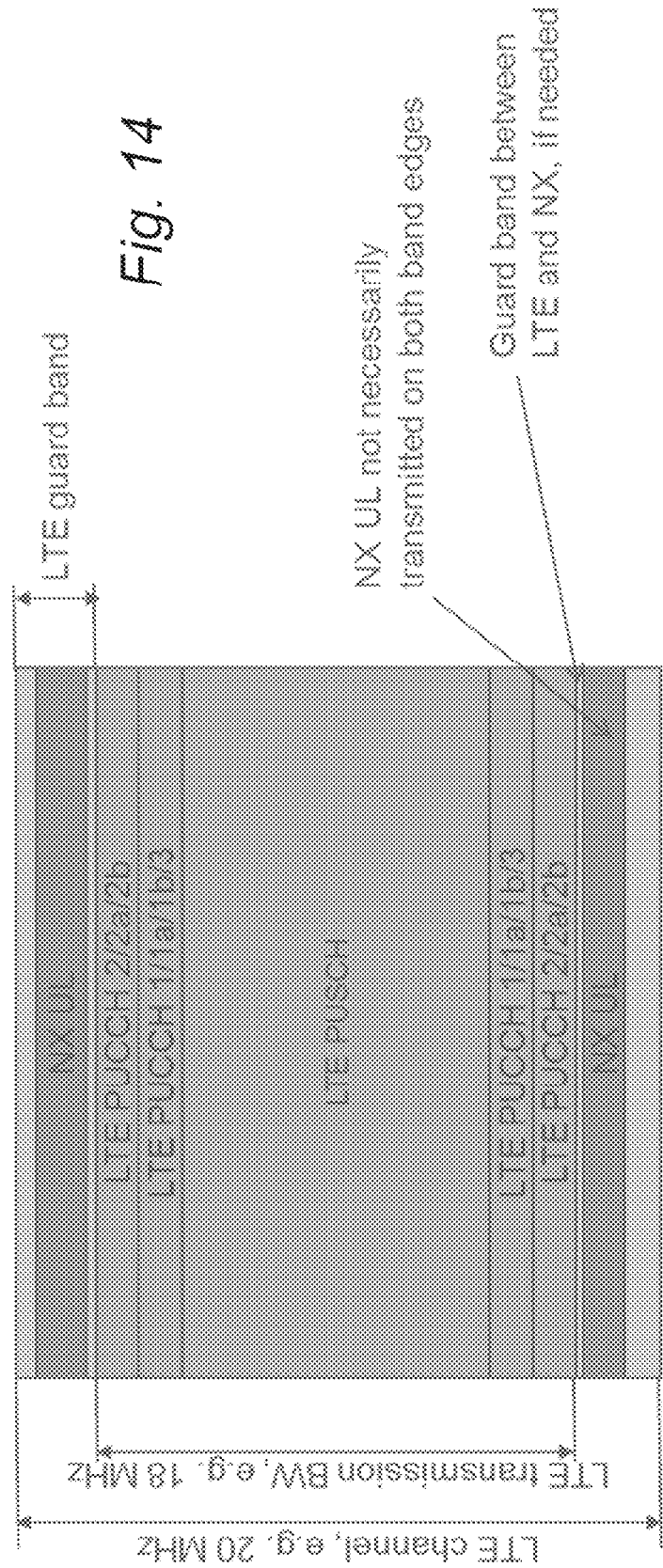
FIG. 14 is a schematic diagram illustrating an example of how a NX uplink is transmitted in the guard band(s) of an LTE UL carrier according to an embodiment.

FIG. 14 is a schematic diagram illustrating an example of how a NX uplink is transmitted in the guard band(s) of an LTE UL carrier according to an embodiment.

For an NX carrier that operates its UL in lower frequencies a UL channel must be determined for its UL. For example, the NX eNB is informed of an LTE UL by an LTE eNB (e.g. via X2, or in case NX and LTE are served by the same node via intra-node communication) or receives this information from another node. Another solution is based on sensing.

Once the NX eNB is aware of the LTE UL it can place the NX UL in the guard bands of the LTE UL carrier. To reduce interference to LTE (since LTE and NX transmissions schemes may not be orthogonal to each other) NX can apply filtering or windowing of its waveform. LTE—since already specified—cannot do that. However, NX is aware of that and can use extra robust transmissions, e.g. low rate channel coding, to protect its own UL. There can also be a guard band between LTE and NX if needed.

If the resources required for NX UL exceed the capacity available in the guard bands also resources used within the active bandwidth (e.g. 18 MHz in a 20 MHz LTE carrier) must be used by NX UL, as will be exemplified below.

To free resources originally used by LTE UL the NX eNB and the LTE eNB may negotiate and agree on a resource split in the UL channel between NX and LTE. If NX and LTE are served by the same node via intra-node communication, if they are two separate nodes they communicate via an external interface such as an X2 interface. Reference can once again be made to FIG. 7. Even a third node can be involved in determining and/or negotiating the resource split.

LTE eNB and NX eNB may thus negotiate a resource split in the UL channel. After negotiation LTE eNB informs its served terminals about this configuration and NX eNB does the same with its served terminals. Alternatively (dashed line in FIG. 7), an LTE eNB may reconfigure NX UEs if NX UEs are also served by LTE (connected via LTE).

Figure 15:
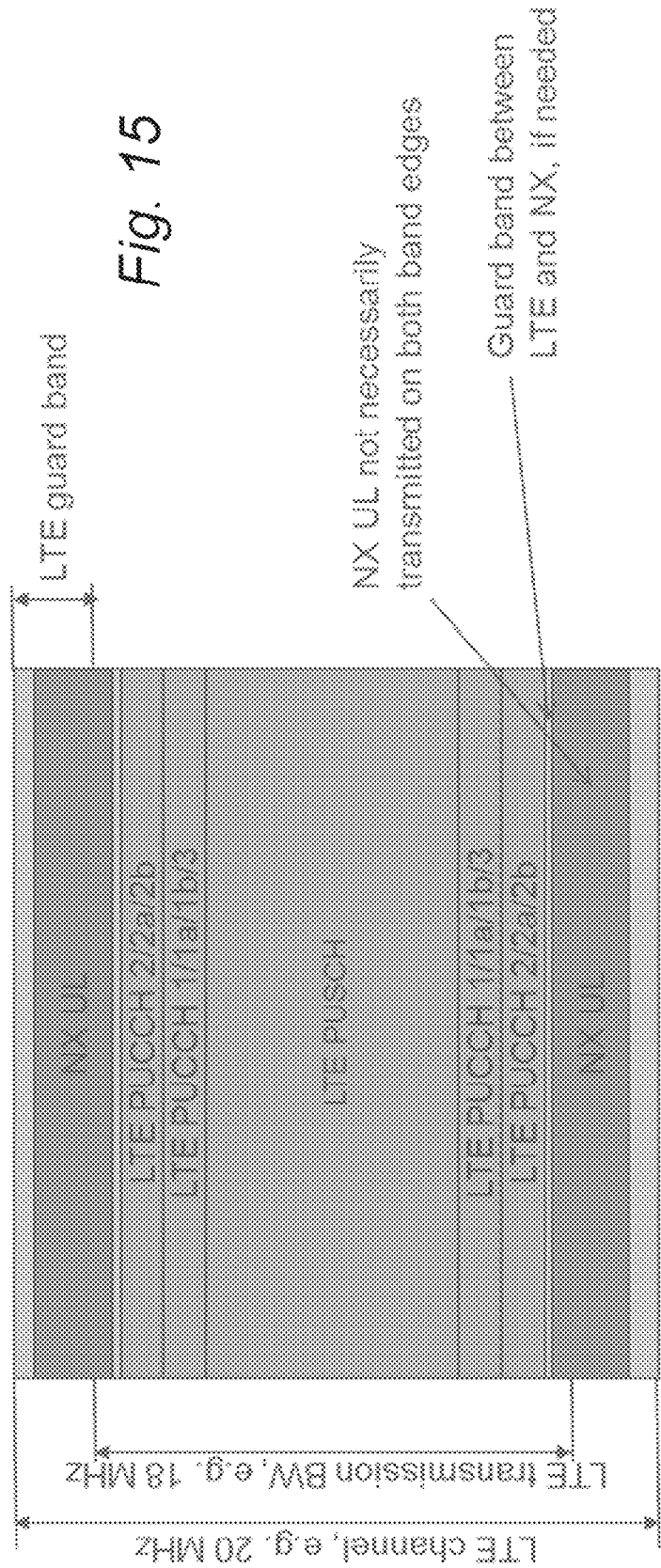
FIG. 15 is a schematic diagram illustrating an example of how a NX uplink is transmitted partly in the guard band(s) of an LTE UL carrier and partly also within the LTE transmission bandwidth according to an embodiment.

FIG. 15 is a schematic diagram illustrating an example of how a NX uplink is transmitted partly in the guard band(s) of an LTE UL carrier and partly also within the LTE transmission bandwidth according to an embodiment.

NX is still partly transmitted in the guard bands but also uses the most outward resources originally used by LTE UL. Examples of parameters that may need to be reconfigured can include cqi-PUCCH-ResourceIndex, cqi-PUCCH-ResourceIndexP1, n3PUCCH-AN-List, n3PUCCH-AN-ListP1, and nRB-CQI. Not transmitting in the guard bands but only within the original LTE bandwidth is possible, too.

Figure 16:
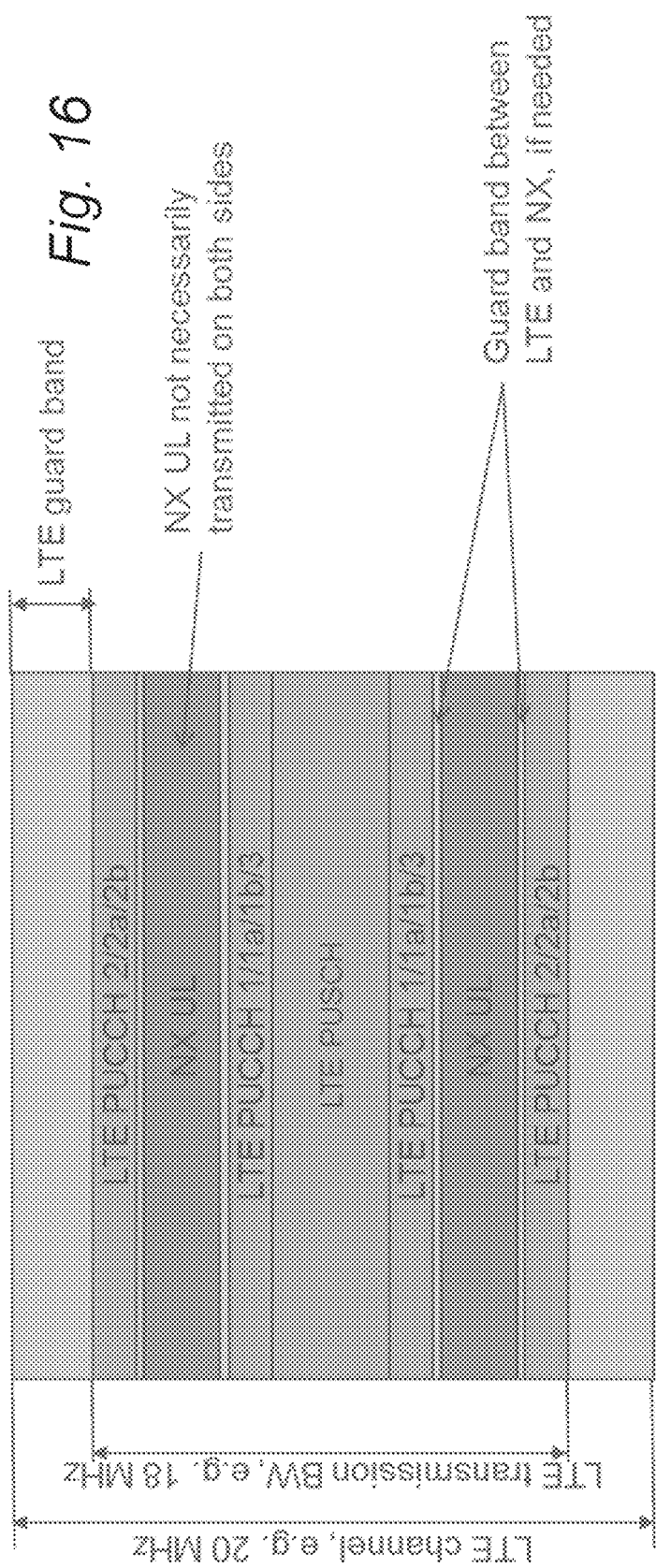
FIG. 16 is a schematic diagram illustrating a first example of how a NX uplink is transmitted within the LTE transmission bandwidth according to an embodiment.

FIG. 16 is a schematic diagram illustrating a first example of how an NX uplink is transmitted within the LTE transmission bandwidth according to an embodiment.

In this example, the NX UL is placed between the PUCCH Format 2 and PUCCH Format 1/1a/1b/3 region. Such a reconfiguration could include changes to the parameters n3PUCCH-AN-List, n3PUCCH-AN-ListP1, and nRB-CQI.

Figure 17:
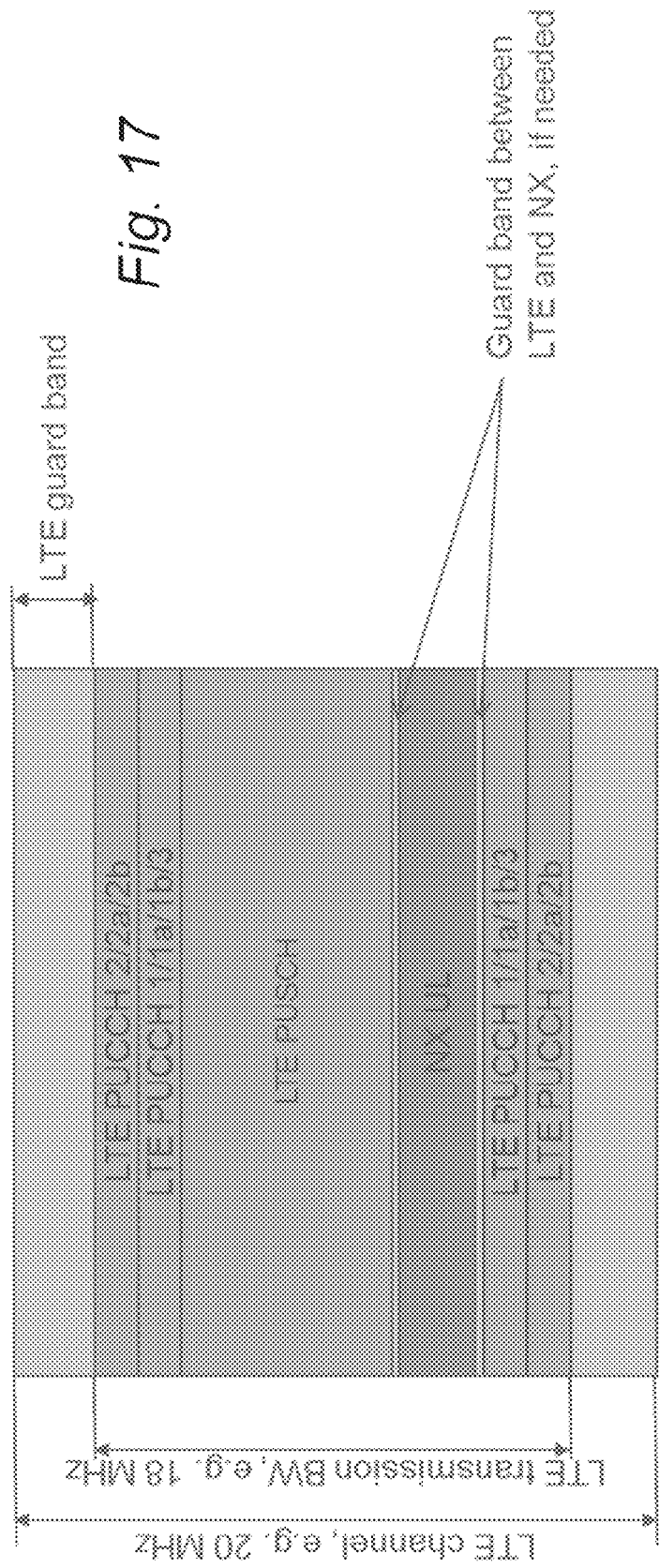
FIG. 17 is a schematic diagram illustrating a second example of how a NX uplink is transmitted within the LTE transmission bandwidth according to an embodiment.

FIG. 17 is a schematic diagram illustrating a second example of how a NX uplink is transmitted within the LTE transmission bandwidth according to an embodiment.

In this example, it is proposed to place NX UL in the LTE PUSCH region, i.e. inside PUCCH Format 1/1a/1b/3. Here PUCCH may not necessarily be reconfigured but the LTE eNB must ensure not to schedule PUSCH transmission at resources used by NX UL. In the example of FIG. 17, the NX UL is located at the PUSCH edge, but it could be even within the PUSCH region.

The different solutions can also be combined, e.g. parts of NX UL are transmitted in LTE guard band and parts are transmitted within the LTE PUCCH region or within PUSCH region.

It is also possible to effectuate sharing of the UL channel between LTE and NX happens in both the frequency domain and the time domain.

Figure 18:
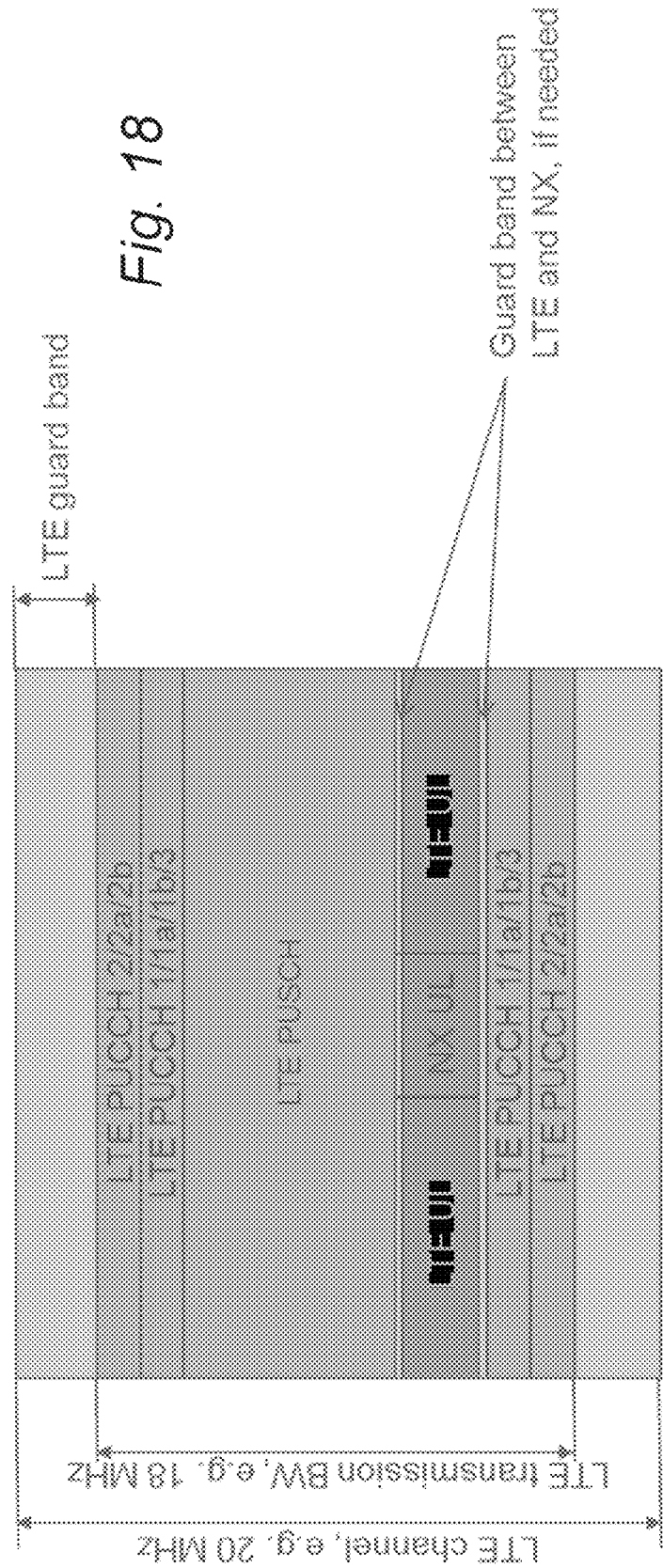
FIG. 18 is a schematic diagram illustrating a third example of how a NX uplink is transmitted within the LTE transmission bandwidth according to an embodiment.

FIG. 18 is a schematic diagram illustrating a third example of how a NX uplink is transmitted within the LTE transmission bandwidth according to an embodiment. In this example, a particular part of the LTE uplink frequency channel is also shared in the time domain between LTE UL and NX UL.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 19:
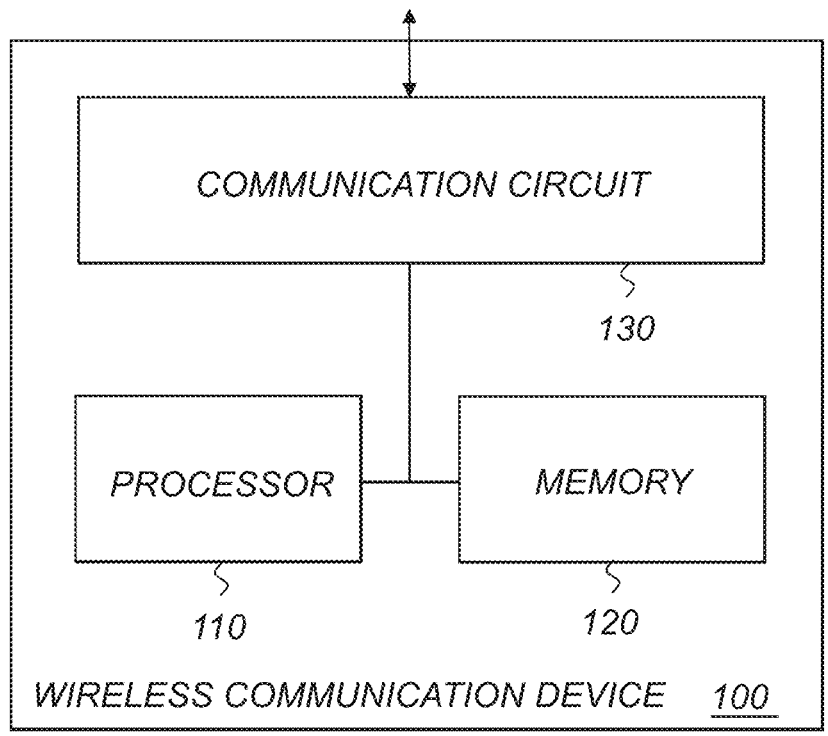
FIG. 19 is a schematic block diagram illustrating an example of a wireless communication device according to an embodiment.

FIG. 19 is a schematic block diagram illustrating an example of a wireless communication device 100, based on a processor-memory implementation according to an embodiment. In this particular example, the wireless communication device 100 comprises a processor 110 and a memory 120, the memory 120 comprising instructions executable by the processor 110, whereby the processor is operative to enable and/or support the operation of the wireless communication device.

The wireless communication device 100 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. By way of example, the communication circuit 130 may include any of the following: a receiver, a transmitter, a transceiver, input/output (I/O) circuitry, input port(s) and/or output port(s).

Figure 20:
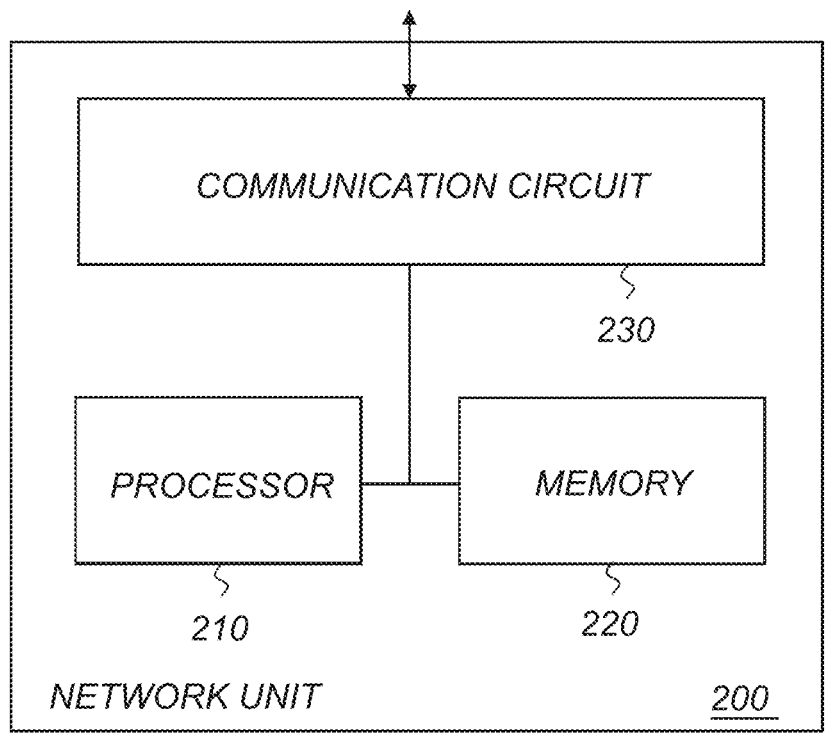
FIG. 20 is a schematic block diagram illustrating an example of a network unit according to an embodiment.

FIG. 20 is a schematic block diagram illustrating an example of a network unit 200, based on a processor-memory implementation according to an embodiment. In this particular example, the network unit 200 comprises a processor 210 and a memory 220, the memory 220 comprising instructions executable by the processor 210, whereby the processor is operative to enable and/or support the operation of the network unit.

The network unit 200 may also include a communication circuit 230. The communication circuit 230 may include functions for wired and/or wireless communication with other devices and/or network nodes in the network. In a particular example, the communication circuit 230 may be based on radio circuitry for communication with one or more other nodes, including transmitting and/or receiving information. The communication circuit 230 may be interconnected to the processor 210 and/or memory 220.

Figure 21:
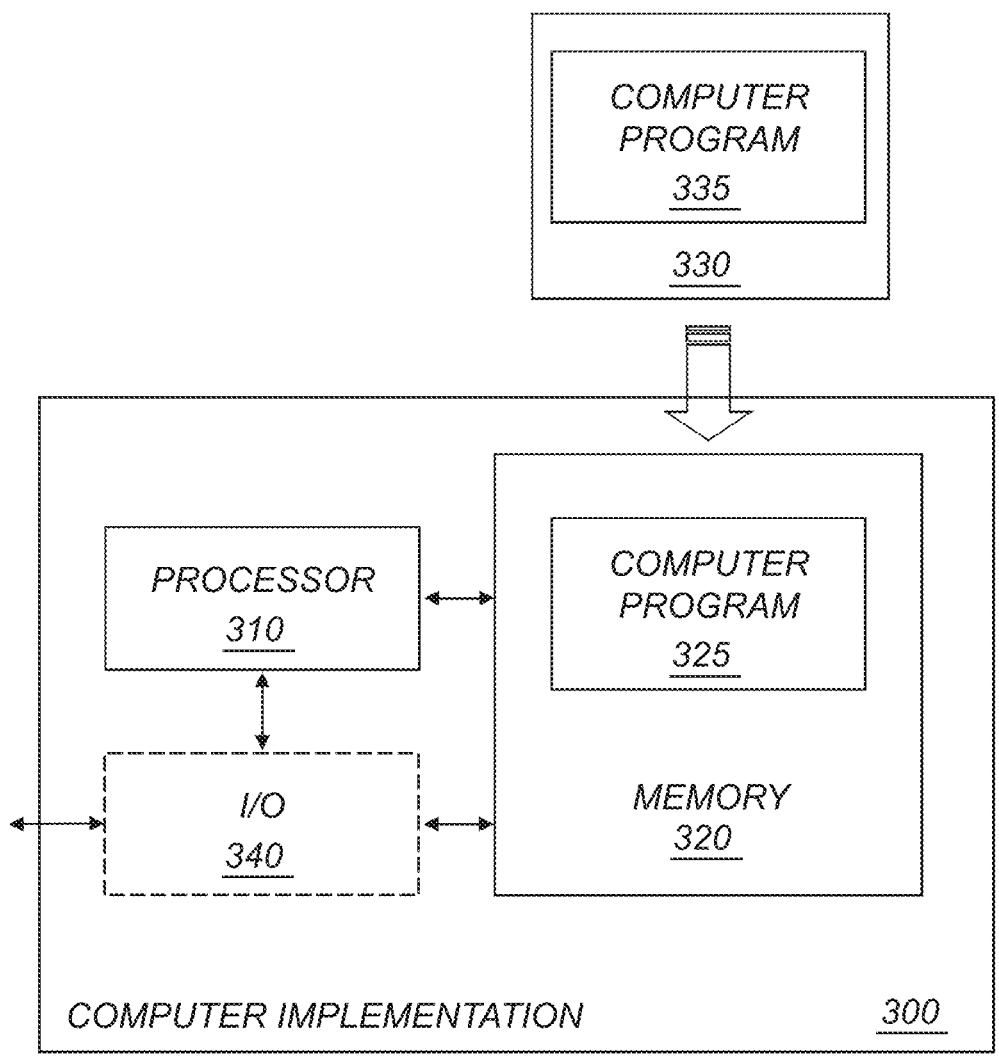
FIG. 21 is a schematic block diagram illustrating an example of a computer-implementation according to an embodiment.

FIG. 21 is a schematic diagram illustrating an example of a computer-implementation 300 according to an embodiment. In this particular example, at least some of the steps, functions, procedures, modules and/or blocks described herein are implemented in a computer program 325; 335, which is loaded into the memory 320 for execution by processing circuitry including one or more processors 310. The processor(s) 310 and memory 320 are interconnected to each other to enable normal software execution. An optional input/output device 340 may also be interconnected to the processor(s) 310 and/or the memory 320 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 310 is thus configured to perform, when executing the computer program 325, well-defined processing tasks such as those described herein.

The processing circuitry does not have to be dedicated to only execute the above-described steps, functions, procedure and/or blocks, but may also execute other tasks.

In a particular embodiment, the computer program 325; 335 comprises instructions, which when executed by at least one processor 310, cause the processor(s) 310 to:
  effectuate configuration(s) of a wireless communication device (10) such that the wireless communication device is configured with an uplink, UL, carrier of a first radio access technology, RAT, for transmission of the UL carrier in an uplink frequency channel overlapping with the uplink frequency channel of a second RAT, and
  effectuate configuration(s) of the wireless communication device (10) such that the wireless communication device is configured with a downlink, DL, carrier of the first RAT, for reception and demodulation and/or decoding of the DL carrier in a frequency channel of the first RAT that is higher than the frequency channel of the second RAT.

In another embodiment, the computer program 325; 335 comprises instructions, which when executed by at least one processor 310, cause the processor(s) 310 to effectuate configuration(s) of a network unit (20; 30) such that the network unit is configured for reception and demodulation and/or decoding of an uplink, UL, carrier of a first radio access technology, RAT in an uplink frequency channel overlapping with the uplink frequency channel of a second RAT.

In yet another embodiment, the computer program 325; 335 comprises instructions, which when executed by at least one processor 310, cause the processor(s) 310 to determine a time and/or frequency resource split of an uplink frequency channel between an uplink channel of a first radio access technology, RAT, and an uplink channel of a second RAT.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 325; 335 may be realized as a computer program product, which is normally carried or stored on a computer-readable medium 320; 330, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 22:
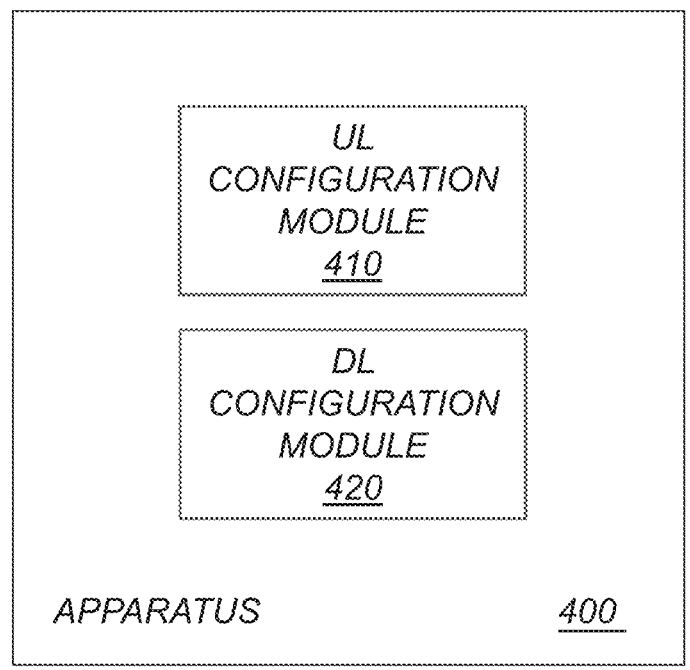
FIG. 22 is a schematic block diagram illustrating an example of an apparatus for controlling operation(s) in a wireless communication device according to an embodiment.

FIG. 22 is a schematic block diagram illustrating an example of an apparatus 400 for controlling operation(s) in a wireless communication device according to an embodiment.

The apparatus 400 comprises:
  an uplink, UL, configuration module 410 for effectuating configuration(s) of the wireless communication device such that the wireless communication device is configured with an uplink, UL, carrier of a first radio access technology, RAT, for transmission of the UL carrier in an uplink frequency channel overlapping with the uplink frequency channel of a second RAT, and
  a downlink, DL, configuration module 420 for effectuating configuration(s) of the wireless communication device such that the wireless communication device is configured with a downlink, DL, carrier of the first RAT, for reception and demodulation and/or decoding of the DL carrier in a frequency channel of the first RAT that is higher than the frequency channel of the second RAT.

Figure 23:
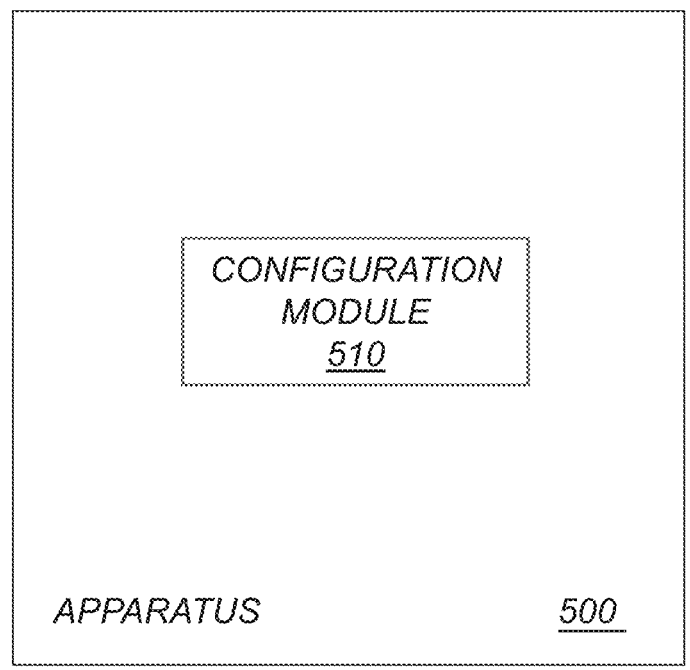
FIG. 23 is a schematic block diagram illustrating an example of an apparatus for controlling operation(s) in a network unit of a wireless communication system according to an embodiment.

FIG. 23 is a schematic block diagram illustrating an example of an apparatus 500 for controlling operation(s) in a network unit of a wireless communication system according to an embodiment.

The apparatus 500 comprises a configuration module 510 for effectuating configuration(s) of a network unit such that the network unit is configured for reception and demodulation and/or decoding of an uplink, UL, carrier of a first radio access technology, RAT, in an uplink frequency channel overlapping with the uplink frequency channel of a second RAT.

Figure 24:
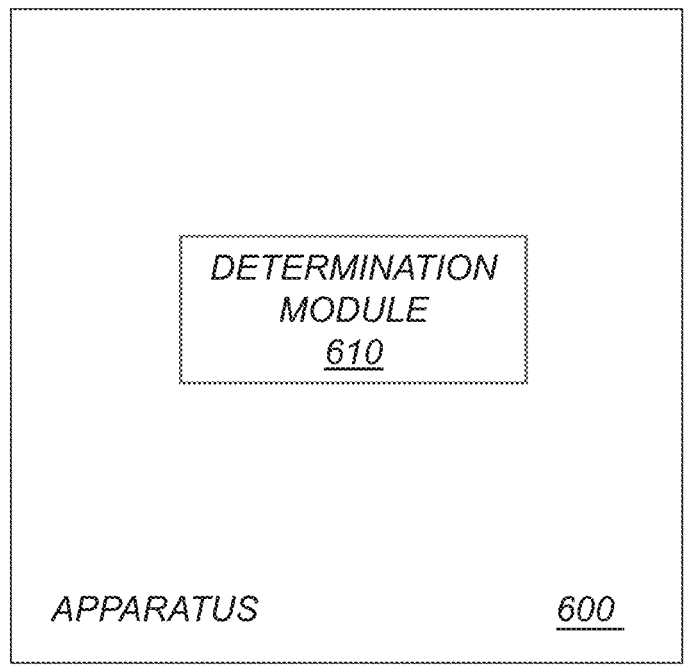
FIG. 24 is a schematic block diagram illustrating an example of an apparatus for management of time and/or frequency resources for radio communication in a wireless communication system according to an embodiment.

FIG. 24 is a schematic block diagram illustrating an example of an apparatus 600 for management of time and/or frequency resources for radio communication in a wireless communication system according to an embodiment.

The apparatus 600 comprises a determination module 610 for determining a time and/or frequency resource split of an uplink frequency channel between an uplink channel of a first radio access technology, RAT, and an uplink channel of a second RAT.

Alternatively it is possible to realize the module(s) in FIG. 22, FIG. 23 and/or FIG. 24 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:
  Consolidation of network functionality into virtualized software running on customized or generic hardware. This is sometimes referred to as network function virtualization.
  Co-location of one or more application stacks, including operating system, running on separate hardware onto a single hardware platform. This is sometimes referred to as system virtualization, or platform virtualization.
  Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

A network unit or Network Device (ND) may generally be seen as an electronic device being communicatively connected to other electronic devices in the network. By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A wireless communication device for operating in a wireless communication system, the wireless communication device having an uplink (UL) carrier of a first radio access technology (RAT) and a downlink (DL) carrier of the first RAT, the wireless communication device comprising:
a communication circuit;
memory; and
a processor associated with the memory, the processor is operable to:
transmit the UL carrier of the first RAT in an uplink frequency channel overlapping with an uplink frequency channel of a second RAT via the communication circuit; and
receive and demodulate and/or decode the DL carrier of the first RAT in a frequency channel of the first RAT that is higher than a downlink frequency channel of the second RAT via the communication circuit.

2. The wireless communication device of claim 1, wherein the wireless communication device is operable to transmit uplink control information in an UL control channel of the UL carrier of the first RAT in the uplink frequency channel overlapping with the uplink frequency channel of the second RAT.

3. The wireless communication device of claim 2, wherein the uplink control information is related to the DL carrier.

4. The wireless communication device of claim 1, wherein the first RAT is a Fifth Generation (5G) or NeXt generation (NX) RAT, and/or the second RAT is a RAT based on Long Term Evolution (LTE).

5. The wireless communication device of claim 1, wherein the wireless communication device is operable to transmit the UL carrier of the first RAT in at least one specific part of the uplink frequency channel of the second RAT.

6. The wireless communication device of claim 5, wherein the wireless communication device is operable to transmit the UL carrier of the first RAT in at least one guard band of the uplink frequency channel of the second RAT.

7. The wireless communication device of claim 5, wherein the wireless communication device is operable to transmit the UL carrier of the first RAT in at least one dedicated part of the uplink frequency channel of the second RAT inside a transmission bandwidth of the frequency channel.

8. The wireless communication device of claim 5, wherein the wireless communication device is operable to receive configuration information indicating the at least one specific part of the uplink frequency channel of the second RAT to enable configuration of the wireless communication device for transmission of the UL carrier of the first RAT in the at least one specific part of the frequency channel.

9. The wireless communication device of claim 1, wherein the wireless communication device is also configured with a DL carrier and/or an UL carrier of the second RAT, based on Dual Connectivity or Multi-Connectivity procedures.

10. The wireless communication device of claim 1, wherein the wireless communication device comprises the processor and the memory, said memory comprising instructions executable by the processor, whereby the processor is operative to enable the operation of the wireless communication device.

11. A method of operating a wireless communication device in a wireless communication system, wherein the method comprises:
receiving and demodulating and/or decoding downlink (DL) signaling in a DL carrier of a first radio access technology (RAT) in a frequency channel of the first RAT that is higher than a downlink frequency channel of a second RAT,
preparing uplink (UL) signaling for transmission in an UL carrier of the first RAT, and
transmitting the UL signaling in the UL carrier of the first RAT in an uplink frequency channel overlapping with an uplink frequency channel of the second RAT.

12. The method of claim 11, wherein uplink control information is transmitted in an UL control channel of the UL carrier of the first RAT in the uplink frequency channel overlapping with the uplink frequency channel of the second RAT.

13. The method of claim 12, wherein the uplink control information is related to the DL carrier.

14. The method of claim 11, wherein the first RAT is a Fifth Generation (5G) or NeXt generation (NX) RAT, and/or the second RAT is a RAT based on Long Term Evolution (LTE).

15. The method of claim 11, wherein the UL carrier of the first RAT is transmitted in at least one specific part of the uplink frequency channel of the second RAT.

16. The method of claim 15, wherein the UL carrier of the first RAT is transmitted in at least one guard band of the uplink frequency channel of the second RAT.

17. The method of claim 15, wherein the UL carrier of the first RAT is transmitted in at least one dedicated part of the uplink frequency channel of the second RAT inside a transmission bandwidth of the frequency channel.

18. The method of claim 15, wherein the wireless communication device also receives configuration information indicating the at least one specific part of the uplink frequency channel of the second RAT to enable configuration of the wireless communication device for transmission of the UL carrier of the first RAT in the at least one specific part of the uplink frequency channel of the second RAT.

19. The method of claim 11, wherein at least part of the uplink frequency channel of the second RAT is shared in a time-multiplexed manner between the first RAT and the second RAT.

20. A network unit for operating in a wireless communication system, the network unit comprising:
a communication circuit;
memory; and
a processor associated with the memory, the processor is operable to:
receive and demodulate and/or decode an uplink (UL) carrier of a first radio access technology (RAT) in an uplink frequency channel overlapping with an uplink frequency channel of a second RAT; and
transmit a downlink (DL) carrier of the first RAT in a frequency channel of the first RAT that is higher than a downlink frequency channel of the second RAT,
wherein the network unit is a base station,
wherein the first RAT is a Fifth Generation (5G) or NeXt generation (NX) RAT, and/or the second RAT is a RAT based on Long Term Evolution (LTE).

21. A network unit for operating in a wireless communication system, the network unit comprising:
a communication circuit;
memory; and
a processor associated with the memory, the processor is operable to:
receive and demodulate and/or decode an uplink (UL) carrier of a first radio access technology (RAT) in an uplink frequency channel overlapping with an uplink frequency channel of a second RAT; and
forward information related to the UL carrier of the first RAT to a base station of the first RAT,
wherein the first RAT is a Fifth Generation (5G) or NeXt generation (NX) RAT, and/or the second RAT is a RAT based on Long Term Evolution (LTE).

22. The network unit of claim 20, wherein the network unit is operable to receive and demodulate and/or decode uplink control information in an UL control channel of the UL carrier of the first RAT in the uplink frequency channel overlapping with the uplink frequency channel of the second RAT.

23. The network unit of claim 22, wherein the uplink control information is related to the DL carrier of the first RAT.

24. The network unit of claim 20, wherein the network unit is operable to receive and demodulate and/or decode the UL carrier of the first RAT in at least one specific part of the uplink frequency channel of the second RAT.

25. The network unit of claim 24, wherein the network unit is operable to receive and demodulate and/or decode the UL carrier of the first RAT in at least one guard band of the uplink frequency channel of the second RAT.

26. The network unit of claim 24, wherein the network unit is operable to receive and demodulate and/or decode the UL carrier of the first RAT in at least one dedicated part of the uplink frequency channel of the second RAT inside a transmission bandwidth of the frequency channel.

27. The network unit of claim 24, wherein the network unit is operable to transmit configuration information indicating the at least one specific part of the uplink frequency channel of the second RAT to at least one associated wireless communication device to enable configuration of the wireless communication device(s) for transmission of the UL carrier of the first RAT in the at least one specific part of the frequency channel.

28. The wireless communication device of claim 1, wherein the DL carrier of the first RAT is in a frequency channel of the first RAT that is higher than both the downlink frequency channel of the second RAT and the uplink frequency channel of the second RAT.

* * * * *

UNITED STATES PATENT AND TRADEMARK OFFICE
CERTIFICATE OF CORRECTION

PATENT NO. : 10,694,393 B2
APPLICATION NO. : 15/525340
DATED : June 23, 2020
INVENTOR(S) : Baldemair et al.

Page 1 of 1

It is certified that error appears in the above-identified patent and that said Letters Patent is hereby corrected as shown below:

In Column 4, Line 65, delete "configuration a" and insert -- configuration of a --, therefor.

In Column 8, Line 30, delete "configuration a" and insert -- configuration of a --, therefor.

In Column 9, Lines 58-59, delete "NOTE: [1]
Band 6 is not applicable" and
insert -- NOTE 1:
Band 6 is not applicable --, therefor.

In Column 9, Lines 60-62,
delete "NOTE:
[2]Restricted to E-UTRA operation when carrier aggregation is configured. The downlink operating band is paired with the uplink operating band (external) of the carrier aggregation configuration that is supporting the configured Pcell." and
insert -- NOTE 2:
Restricted to E-UTRA operation when carrier aggregation is configured. The downlink operating band is paired with the uplink operating band (external) of the carrier aggregation configuration that is supporting the configured Pcell. --, therefor.

In Column 23, Line 15, delete "sometimes" and insert -- (sometimes --, therefor.

Signed and Sealed this
Twenty-second Day of September, 2020

Andrei Iancu
*Director of the United States Patent and Trademark Office*